US012792316B2

(12) United States Patent
Briant et al.

(10) Patent No.: US 12,792,316 B2
(45) Date of Patent: Nov. 10, 2026

(54) MULTI-USER GENERATIVE AI FOR INDUSTRIAL AUTOMATION VISUALIZATION ENVIRONMENT

(71) Applicant: Rockwell Automation Technologies, Inc., Mayfield Heights, OH (US)

(72) Inventors: Stephen C. Briant, Moon Township, PA (US); Sharon Billi-Duran, Pepper Pike, OH (US); Michael B. Miller, New Berlin, WI (US); Maurizio Fumagalli, Meda (IT); Jason P. Wright, Pepper Pike, OH (US); Steven J. Kowal, Milwaukee, WI (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 203 days.

(21) Appl. No.: 18/824,650

(22) Filed: Sep. 4, 2024

(65) Prior Publication Data

US 2026/0064380 A1 Mar. 5, 2026

(51) Int. Cl.
*G06F 9/35* (2018.01)
*A01H 6/82* (2018.01)
(Continued)

(52) U.S. Cl.
CPC .................. *G06F 8/35* (2013.01); *G06F 8/38* (2013.01); *G06T 13/80* (2013.01)

(58) Field of Classification Search
CPC ..... G06F 8/35; G06F 8/38; G06F 8/33; G06F 8/65; G06F 8/71; G06F 9/453;
(Continued)

(56) References Cited

U.S. PATENT DOCUMENTS 10,515,121 B1 12/2019 Setlur et al.
12,602,025 B2 * 4/2026 Carrara ............. G05B 19/4063
(Continued)

FOREIGN PATENT DOCUMENTS

CN 102130783 A 7/2011
CN 107770797 A 3/2018
(Continued)

OTHER PUBLICATIONS

S. Liu, Three key considerations for the next generation of HMI, 4 pages (Year: 2024).*
Extended European Search Report received for European Patent Application Serial No. 25197304.6 dated Mar. 18, 2026, 9 pages.
(Continued)

*Primary Examiner* — Thuy Dao
(74) *Attorney, Agent, or Firm* — Amin, Turocy & Watson, LLP

(57) ABSTRACT

A human-machine interface (HMI) development system leverages a generative AI model to assist in development of HMI projects in accordance with specified functional requirements, which can be provided to the development system as intuitive natural language spoken or written text. The system can formulate and implement HMI project edits during design time based on analysis of this natural language design input. After the HMI project is deployed as a runtime application, the system can also receive and process natural language requests to modify the runtime HMI in accordance with described modification criteria.

20 Claims, 12 Drawing Sheets

(51) Int. Cl.

| | |
|---|---|
| ***G06F 8/35*** | (2018.01) |
| ***G06F 8/38*** | (2018.01) |
| ***G06N 3/02*** | (2006.01) |
| ***G06N 3/0455*** | (2023.01) |
| ***G06N 20/00*** | (2019.01) |
| ***G06T 13/80*** | (2011.01) |

(58) Field of Classification Search

CPC .......... G06F 40/30; G06F 40/35; G06F 40/56; G06T 13/80; G06N 3/04; G06N 3/045; G06N 3/047; G06N 3/0475; G06N 3/08; G06N 3/084; G06N 3/088; G06N 20/00

See application file for complete search history.

(56) References Cited

U.S. PATENT DOCUMENTS

| | | | |
|---|---|---|---|
| 2016/0342152 A1 | 11/2016 | Bliss | |
| 2020/0104723 A1 | 4/2020 | Reissner et al. | |
| 2021/0011465 A1 | 1/2021 | Swartzendruber | |
| 2021/0096827 A1 | 4/2021 | Stump et al. | |
| 2021/0294279 A1 | 9/2021 | Stump | |
| 2021/0397171 A1 | 12/2021 | Sayyarrodsari et al. | |
| 2022/0058306 A1 | 2/2022 | Mabote | |
| 2022/0188990 A1 | 6/2022 | Rao et al. | |
| 2023/0129503 A1 | 4/2023 | Emerson et al. | |
| 2023/0152790 A1 | 5/2023 | Stump et al. | |
| 2023/0153083 A1 | 5/2023 | Stump et al. | |
| 2023/0333827 A1 | 10/2023 | Gorrono et al. | |
| 2023/0376284 A1 | 11/2023 | Shi et al. | |
| 2023/0393870 A1 | 12/2023 | Singh | |
| 2024/0086051 A1 | 3/2024 | Ciminelli et al. | |
| 2024/0403714 A1 | 12/2024 | Tinaz | |
| 2025/0004428 A1 | 1/2025 | Anthony | |
| 2025/0004450 A1 | 1/2025 | Anthony | |
| 2025/0278903 A1* | 9/2025 | Siebel | G06N 3/044 |
| 2025/0291555 A1 | 9/2025 | Carrara | |
| 2025/0298382 A1 | 9/2025 | Carrara | |
| 2026/0064400 A1 | 3/2026 | Briant | |

FOREIGN PATENT DOCUMENTS

| | | |
|---|---|---|
| CN | 115756455 A | 3/2023 |
| CN | 118466957 A | 8/2024 |

OTHER PUBLICATIONS

Extended European Search Report received for European Patent Application Serial No. 25196687.5 dated Jan. 28, 2026, 9 pages.

Extended European Search Report received for European Patent Application Serial No. 25196401.1 dated Jan. 23, 2026, 9 pages.

Extended European Search Report received for European Patent Application Serial No. 25210696.8 dated Mar. 16, 2026, 14 pages.

Vaithilingam, et al. DynaVis: Dynamically Synthesized UI Widgets for Visualization Editing. Proceedings of the Conference on Governance, Understanding and Integrating of Data for Responsible and Effective AI. ACMPUB27, New York, NY, USA, May 11, 2024, pp. 1-17.

Notice of Allowance received for U.S. Appl. No. 18/934,923 dated Sep. 1, 2026, 92 pages.

Non-Final Office Action received for U.S. Appl. No. 18/824,647 dated Aug. 3, 2026, 24 pages.

Non-Final Office Action received for U.S. Appl. No. 18/824,652 dated Aug. 14, 2026, 52 pages.

Extended European Search Report received for European Patent Application Serial No. 25223878.7 dated May 27, 2026, 12 pages.

Chakrabarty et al. "Free and Customizable Code Documentation with LLMs: A Fine-Tuning Approach", arXiv:2412.00726v1, Dec 2024, 09 pages.

Wang et al., "Screen2Words: Automatic Mobile UI Summarization with Multimodal Learning", The 34th Annual ACM Symposium on User Interface Software and Technology. Oct. 2021, pp. 498-510.

Extended European Search Report received for European Patent Application Serial No. 25226953.5 dated Jun. 5, 2026, 8 pages.

Extended European Search Report received for European Patent Application Serial No. 26152933.3 dated Jun. 17, 2026, 13 pages.

Extended European Search Report received for European Patent Application Serial No. 26152931.7 dated Jun. 22, 2026, 15 pages.

Abdelrahmen Mashaal, et al. Evaluation of GPT 40 for Mobile Applications Code Conversion. 2024 12th International Japan-Africa Conference on Electronics, Communications, and Computations (JAC-ECC) IEEE, Dec. 16, 2024, pp. 219-224.

Extended European Search Report received for European Patent Application Serial No. 26158930.3 dated Jun. 24, 2026, 12 pages.

Extended European Search Report received for European Patent Application Serial No. 26159824.7 dated Jun. 23, 2026, 14 pages.

Gowaikar Shreeyash, et al. An Agentic Approach to Automatic Creation of P&ID Diagrams from Natural Language Descriptions. Dec. 17, 2024. https://arxiv.org/pdf/2412.12898 retrieved Jun. 8, 2026.

Koziolek Heiko, et al. LLM-based and Retrieval-Augmented Control Code Generation. 2024 IEEE/ACM International Workshop on Large Language Models for Code (LLM4CODE), Acm, Apr. 20, 2024, pp. 22-29.

Xia Weiyi, et al. Intelligent PLC Code Generation in HCPS 2.0: A Multi-dimensional Taxonomy and Evolutionary Framework. Proceedings of the Inaugural Conference on the Principles and Practice of Programming, 2002 (PPPJ '02); Proceedings of the Second Workshop on Intermediate Representation Engineering for Virtual Machines, 2002, Dublin, Ireland, Jun. 13-14, 2002; ACM, Feb. 21, 2025, pp. 202-212.

Koziolek Heiko, et al. LLM-based Control Code Generation using Image Recognition. Proceedings of the 17th ACM Conference on Security and Privacy in Wireless and Mobile Networks ACMPUB27, New York, NY, USA, Apr. 20, 2024 (Apr. 20, 2024), pp. 38-45.

* cited by examiner

MULTI-USER GENERATIVE AI FOR INDUSTRIAL AUTOMATION VISUALIZATION ENVIRONMENT

TECHNICAL FIELD

The subject matter disclosed herein relates generally to industrial automation systems, and, for example, to development and deployment of industrial human-machine interfaces (HMIs).

BACKGROUND ART

Industrial human-machine interfaces, or HMIs, comprise a computer terminal with display capabilities that executes an HMI runtime application, which defines the display screens that are presented to the operator of an industrial automation system, the navigation structure for navigating between the display screens, and the data links or bindings between the graphical elements and corresponding data tags in the controller's data table. HMI developers typically design these aspects of an HMI using an HMI development platform. These HMI development platforms support a graphical and menu-driven development workflow in which the developer selects graphical display and control elements from a library of elements for inclusion on each display interface, and manipulates these selected elements—e.g., via drag-and-drop interactions—on a mock-up of the display interface to yield a desired layout.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a system is provided, comprising a user interface component configured to render a human-machine interface (HMI) development interface and to receive, via interaction with the HMI development interface, a first natural language design prompt that describes a first functional requirement from a first user having a first defined role within an industrial enterprise and a second natural language design prompt that describes a second functional requirement from a second user having a second defined role within the industrial enterprise; a generative artificial intelligence (AI) component configured to determine a first edit to the HMI project that satisfies the first functional requirement and a second edit to the HMI project that satisfies the second functional requirement based on analysis of the first natural language design prompt, the second natural language design prompt, and content of one or more custom models trained with training data; and an HMI generation component configured to selectively apply at least one of the first edit or the second edit to the HMI project based on relative priorities of the first defined role and the second defined role, wherein the HMI project defines display screens, layouts of graphical objects on the display screens, and communication links between the graphical objects and corresponding sources of data generated by an industrial automation system, and the HMI project is configured to, in response to execution on an HMI terminal device, read data from the sources of data and visualize the data via the graphical objects defined by the HMI project.

Also, one or more embodiments provide a method, comprising rendering, by a system comprising a processor, a human-machine interface (HMI) development interface on one or more client devices; receiving, by the system via interaction with the HMI development interface, a first natural language design prompt that describes a first functional requirement from a first user having a first defined role within an industrial enterprise and a second natural language design prompt that describes a second functional requirement from a second user having a second defined role within the industrial enterprise; determining, by the system, a first edit to the HMI project that satisfies the first functional requirement and a second edit to the HMI project that satisfies the second functional requirement based on analysis of the first natural language design prompt, the second natural language design prompt, and content of one or more custom models trained with training data; and selectively applying, by the system, at least one of the first edit or the second edit to the HMI project based on relative priorities of the first defined role and the second defined role, wherein the HMI project defines display screens, layouts of graphical objects on the display screens, and communication links between the graphical objects and corresponding sources of data generated by an industrial automation system, and the HMI project is configured to, in response to execution on an HMI terminal device, read data from the sources of data and visualize the data via the graphical objects defined by the HMI project.

Also, according to one or more embodiments, a non-transitory computer-readable medium is provided having stored thereon instructions that, in response to execution, cause a human-machine interface (HMI) development system to perform operations, the operations comprising rendering a human-machine interface (HMI) development interface on one or more client devices; receiving, via interaction with the HMI development interface, a first natural language design prompt that describes a first functional requirement from a first user having a first defined role within an industrial enterprise; receiving, via interaction with the HMI development interface, a second natural language design prompt that describes a second functional requirement from a second user having a second defined role within the industrial enterprise; determining a first edit to the HMI project that satisfies the first functional requirement and a second edit to the HMI project that satisfies the second functional requirement based on analysis of the first natural language design prompt, the second natural language design prompt, and content of one or more custom models trained with training data; and selectively applying at least one of the first edit or the second edit to the HMI project based on relative priorities of the first defined role and the second defined role, wherein the HMI project defines display screens, layouts of graphical objects on the display screens, and communication links between the graphical objects and corresponding sources of data generated by an industrial automation system, and the HMI project is configured to, in response to execution on an HMI terminal device, read data from the sources of data and visualize the data via the graphical objects defined by the HMI project.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
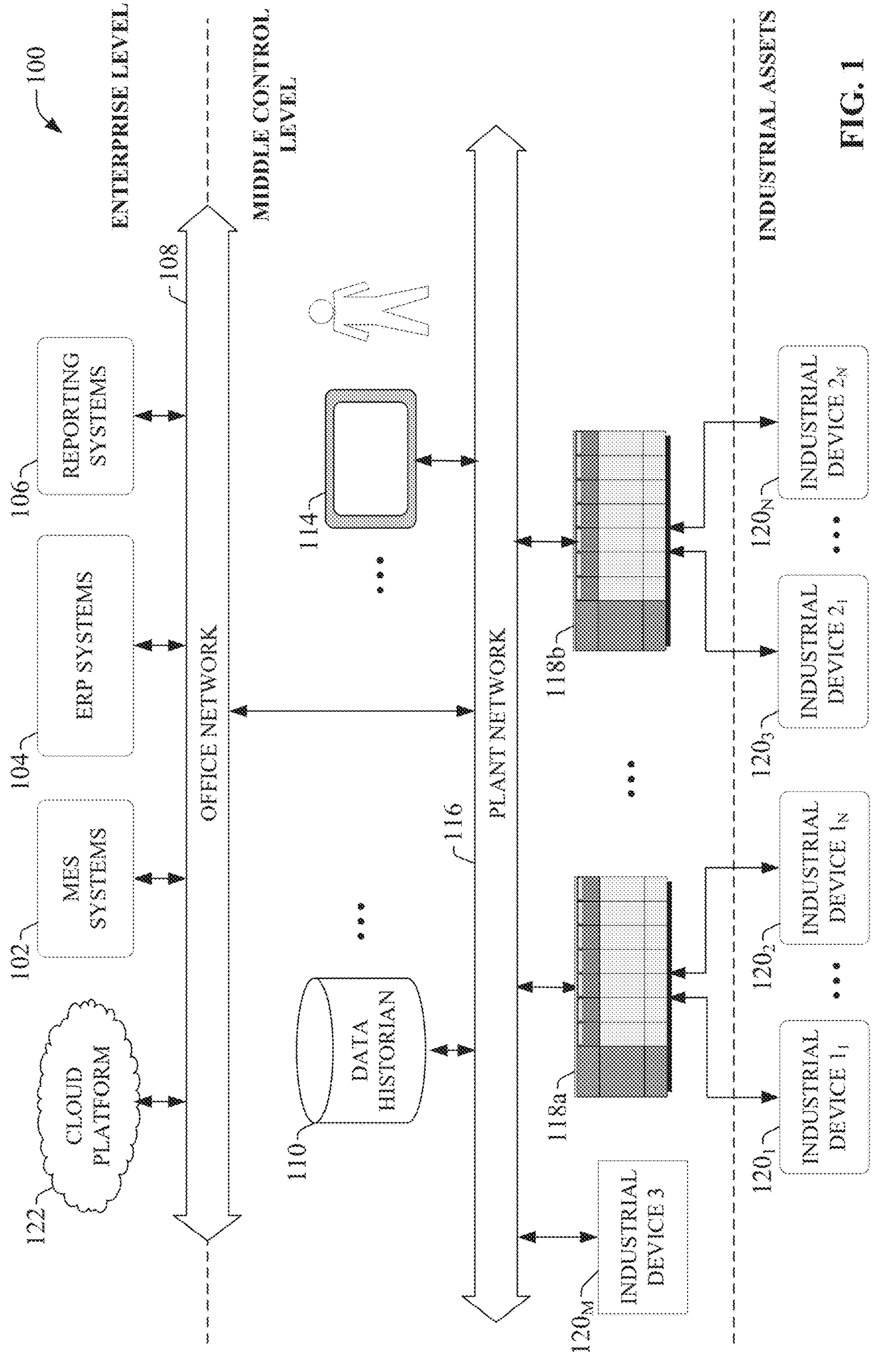
FIG. 1 is a block diagram of an example industrial control environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

FIG. 1 is a block diagram of an example industrial control environment 100. In this example, a number of industrial controllers 118 are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial assets or systems (e.g., industrial machines). One or more industrial controllers 118 may also comprise a soft controller executed on a personal computer or other hardware platform, or on a cloud platform. Some hybrid devices may also combine controller functionality with other functions (e.g., visualization). The control programs executed by industrial controllers 118 can comprise any conceivable type of code used to process input signals read from the industrial devices 120 and to control output signals generated by the industrial controllers, including but not limited to ladder logic, sequential function charts, function block diagrams, or structured text.

Industrial devices 120 may include both input devices that provide data relating to the controlled industrial systems to the industrial controllers 118, and output devices that respond to control signals generated by the industrial controllers 118 to control aspects of the industrial systems. Example input devices can include telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot control inputs, valves, and the like. Some industrial devices, such as industrial device 120M, may operate autonomously on the plant network 116 without being controlled by an industrial controller 118.

Industrial controllers 118 may communicatively interface with industrial devices 120 over hardwired or networked connections. For example, industrial controllers 118 can be equipped with native hardwired inputs and outputs that communicate with the industrial devices 120 to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 118 can also communicate with industrial devices 120 over the plant network 116 using, for example, a communication module or an integrated networking port. Exemplary networks can include the Internet, intranets, Ethernet, DeviceNet, ControlNet, Data Highway and Data Highway Plus (DH/DH+), Remote I/O, Fieldbus, Modbus, Profibus, wireless networks, serial protocols, and the like. The industrial controllers 118 can also store persisted data values that can be referenced by the control program and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.). Similarly, some intelligent devices—including but not limited to motor drives, instruments, or condition monitoring modules—may store data values that are used for control and/or to visualize states of operation. Such devices may also capture time-series data or events on a log for later retrieval and viewing.

Industrial automation systems often include one or more human-machine interface (HMIs) terminals 114 that allow plant personnel to view telemetry and status data associated with the automation systems, and to control some aspects of system operation. HMI terminals 114 may communicate with one or more of the industrial controllers 118 over a plant network 116, and exchange data with the industrial controllers to facilitate visualization of information relating to the controlled industrial processes on one or more pre-developed operator interface screens. HMI terminals 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMI terminals 114 execute HMI runtime applications that generate one or more display screens through which the operator interacts with the industrial controllers 118, and thereby with the controlled processes and systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMI terminals 114 and presented on one or more of the display screens according to display formats chosen by the HMI developer. HMI terminals 114*s* may comprise fixed location or mobile devices with either user-installed or pre-installed operating systems, and either user-installed or pre-installed graphical application software.

Some industrial environments may also include other systems or devices relating to specific aspects of the controlled industrial systems. These may include, for example, one or more data historians 110 that aggregate and store production information collected from the industrial controllers 118 and other industrial devices.

Industrial devices 120, industrial controllers 118, HMI terminals 114, associated controlled industrial assets, and other plant-floor systems such as data historians 110, vision systems, and other such systems operate on the operational technology (OT) level of the industrial environment. Higher level analytic and reporting systems may operate at the higher enterprise level of the industrial environment in the information technology (IT) domain; e.g., on an office network 108 or on a cloud platform 122. These higher level systems can include, for example, enterprise resource planning (ERP) systems 104 that integrate and collectively manage high-level business operations, such as finance, sales, order management, marketing, human resources, or other such business functions. Manufacturing Execution Systems (MES) 102 can monitor and manage control operations on the control level in view of higher-level business considerations, driving those control-level operations toward outcomes that satisfy defined business goals (e.g., order fulfillment, resource tracking and management, asset utilization tracking, etc.). Reporting systems 106 can collect operational data from industrial devices on the plant floor and generate daily or shift reports that summarize operational statistics of the controlled industrial assets.

Figure 2:
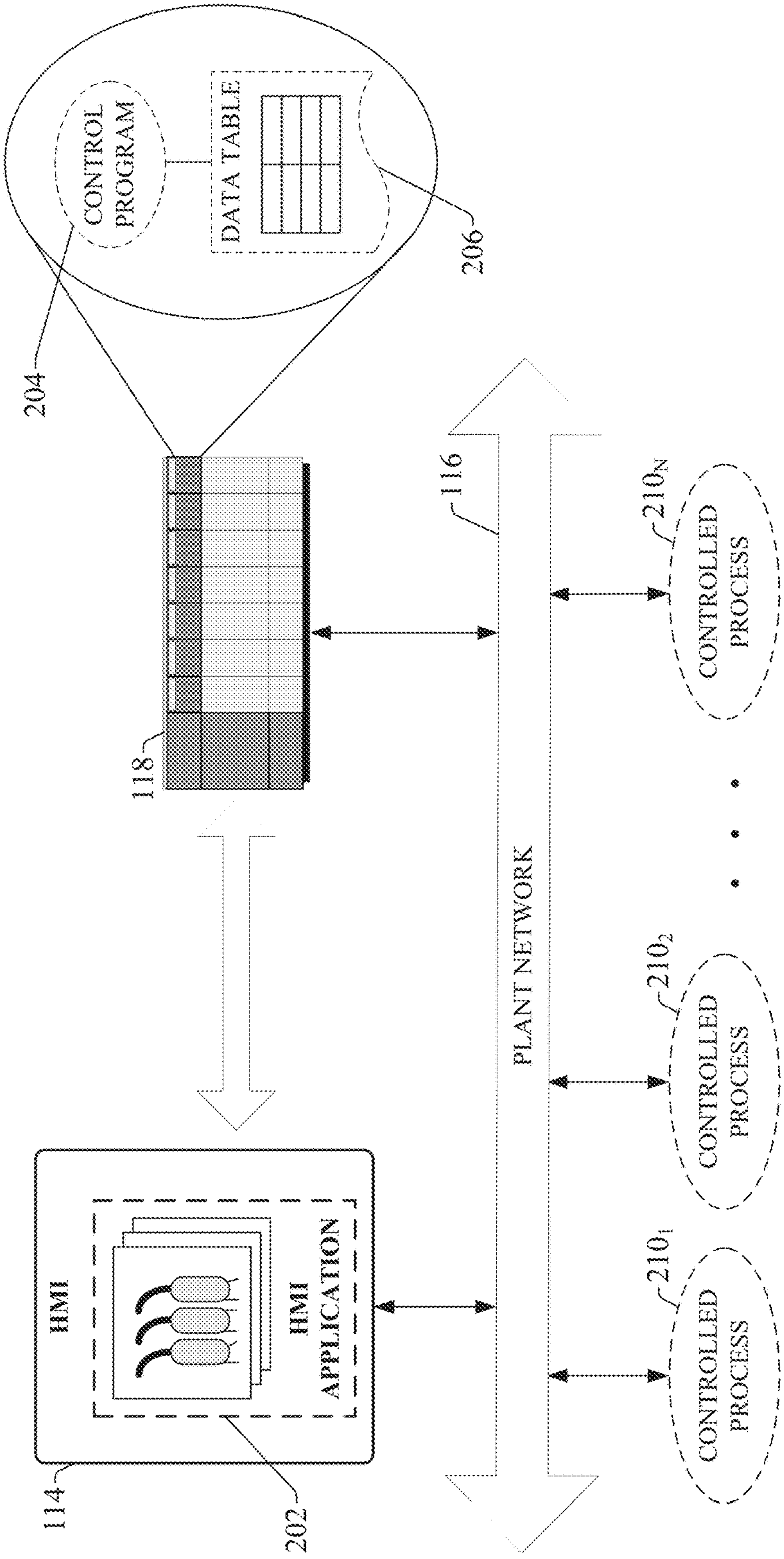
FIG. 2 is a diagram of a generalized architecture including an industrial controller and a human-machine interface (HMI).

FIG. 2 is a diagram of a generalized architecture including an industrial controller 118 and an HMI 114. An industrial facility can comprise one or more controlled processes $210_1$-$210_N$ relating to product manufacture, machining, motion control, batch processing, material handling, or other such industrial functions. As noted above, the devices and machines that carry out the processes $210_1$-$210_N$ (e.g., devices 120 of FIG. 1 and their associated machines) can be monitored and controlled by an industrial controller 118, which executes a control program 204 to facilitate monitoring and control of controlled processes $210_1$-$210_N$. Control program 204 can be substantially any type of code used to process input signals read into the controller 118 and to control output signals from the controller 118, including but not limited to ladder logic programming, sequential function charts, function block diagrams, or structured text. Data read into or generated by controller 118 can be stored in a data table 206 within the controller's memory.

Controller 118 can exchange data with the input and output devices of the controlled processes $210_1$-$210_N$ over the plant network 116, or over another hardwired or networked connection. For example, controller 118 can be equipped with native hardwired input and output points that exchange digital and analog signals with the field devices to effect control of the devices. The native controller I/O can include digital I/O that transmits and receives discrete voltage signals to and from the field devices, or analog I/O that transmits and receives analog voltage or current signals to and from the devices. The controller 118 translates input signals from the controlled processes 210 into digital and analog data values, which are stored in the controller's data table 206. The control program 204 processes these input data values in accordance with a user-defined control algorithm and sets values of the controller's digital and analog output signals based on this processing. The values of the output signals, and any other values calculated by the control program 204, are stored in the data table 206.

HMI 114 leverages data stored in the controller's data table 206 to visualize information relating to the controlled processes $210_1$-$210_N$ as graphical and alphanumeric information. To this end, the HMI 114 communicates with the controller 118 via the plant network 116 or via a direct connection, and reads data from and writes data to the data table 206 over this connection. The HMI 114 renders navigable interface display screens that present current operational or status information for the controlled processes $210_1$-$210_N$. In some implementations, the display screens can render graphical representations of the machines that carry out the controlled processes $210_1$-$210_N$, and can animate these graphical representations based on the current statuses of the corresponding machines, as determined based on the data values contained in the controller's data table 206. These animations can include, for example, setting a color of a graphical element based on a state of a corresponding machine component, altering the height of a fill graphic based on a corresponding fill level of a tank, setting a position or orientation of a graphical element based on a corresponding position or orientation of a machine component, displaying alphanumeric text conveying metered values (e.g., temperatures, pressures, flows, etc.), or other such animations.

Operators can also interact with the HMI's display screens to send commands to the controller 118 that alter operation of the controlled processes $210_1$-$210_N$. These commands can include, for example, altering control setpoints, initiating start or stop commands, changing an operating mode of a machine or process, clearing alarm messages render by the HMI 114, or other such commands. To provide a means to issue these commands, the display screens can include interactive graphical controls—such as graphical pushbuttons, data entry fields, or other such controls—that are linked to corresponding data tags defined in the data table 206. Through interaction with these controls, the operator can write digital or analog values to these data tags, and these values are processed by the control program 204 in connection with controlling the industrial processes $210_1$-$210_N$.

In general, an HMI 114 comprises a computer terminal with display capabilities that executes an HMI runtime application 202. The HMI runtime application 202 defines the display screens that are presented to the operator (including definitions of the graphical elements and controls included on each display screen and the arrangements of those elements), the navigation structure for navigating between the display screens, and the data links or bindings between the graphical elements and corresponding data tags in the controller's data table 206. HMI developers typically design these aspects of an HMI using an HMI development platform, which compiles the design into an HMI runtime application 202 that can be downloaded to, and executed on, the HMI terminal. These HMI development platforms typically support a graphical and menu-driven development workflow, in which the developer selects graphical display and control elements from a library of elements for inclusion on each display interface, and manipulates these selected elements—e.g., via drag-and-drop interactions—on a mock-up of the display interface to yield a desired layout. For elements whose appearance or behavior is a function of a value of a data tag defined in the controller's data table 206, the developer typically defines the binding to the appropriate data tag by invoking the element's properties window and specifying the data tag in an appropriate property field of the window. Similarly, for elements designed to write data to the controller 118—such as graphical pushbuttons and data entry fields—users typically set the data tags to which those elements write their data via interaction with the elements' properties windows. This graphical development approach can also be cumbersome and time-consuming.

As an alternative to this graphical HMI development approach, one or more embodiments described herein provide an HMI development system that supports the use of generative artificial intelligence (AI) to assist in development and use of industrial HMI applications. In one or more embodiments, the HMI development system can support industry-specific prompt engineering services that assist a user in developing industrial visualization projects using natural language prompts that describe functional and visual requirements of the HMI. To this end, the HMI development system can make use of a generative AI model and associated neural networks to generate portions of an HMI project—including display screen content and layouts, screen navigational structures, links between animated graphics and data sources such as controller data tags, alarm definitions, color settings, and other such aspects—in accordance with functional requirements provided to the HMI development system as intuitive natural language inputs (e.g., spoken or written natural language text). The HMI development system can include a specialized prompt engineering layer and associated custom models—trained using knowledge of various types of industrial control applications, knowledge of specific types of industrial assets, vertical-specific industrial standards and best practices, sample HMI layouts, and other such training data—that generate prompts or meta-prompts based on a user's natural language inputs for submission to generative AI models such as large language models (LLMs).

Figure 3:
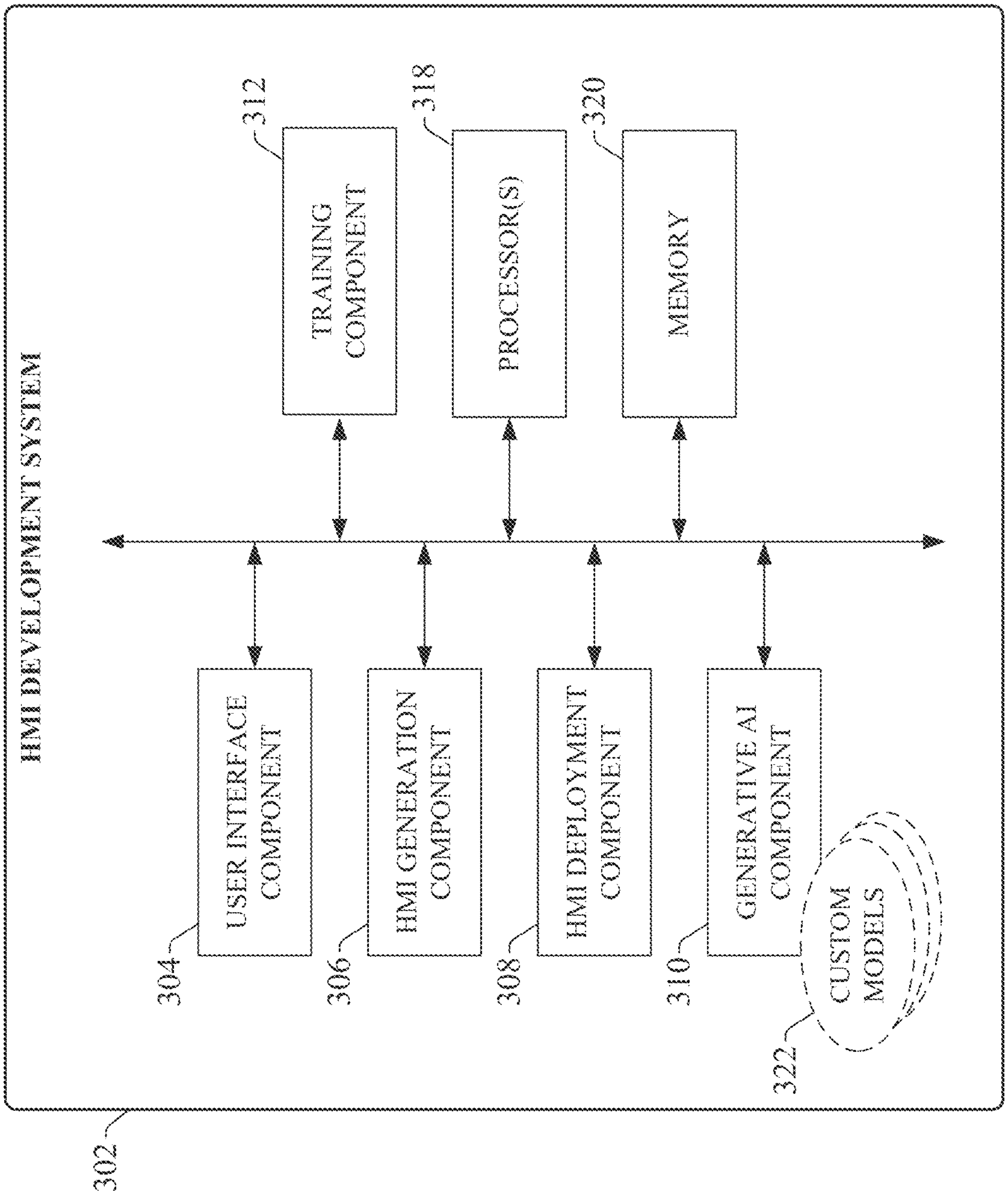
FIG. 3 is a block diagram of an example HMI development system.

FIG. 3 is a block diagram of an example HMI development system 302 according to one or more embodiments of this disclosure. Aspects of the systems, apparatuses, or processes explained in this disclosure can constitute machine-executable components embodied within machine (s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

HMI development system 302 can include a user interface component 304, an HMI generation component 306, an HMI deployment component 308, a generative AI component 310, a training component 312, one or more processors 318, and memory 320. In various embodiments, one or more of the user interface component 304, HMI generation component 306, HMI deployment component 308, generative AI component 310, training component 312, the one or more processors 318, and memory 320 can be electrically and/or communicatively coupled to one another to perform one or more of the functions of the HMI development system 302. In some embodiments, components 304, 306, 308, 310, and 312 can comprise software instructions stored on memory 320 and executed by processor(s) 318. HMI development system 302 may also interact with other hardware and/or software components not depicted in FIG. 3. For example, processor(s) 318 may interact with one or more external user interface devices, such as a keyboard, a mouse, a display monitor, a touchscreen, or other such interface devices.

User interface component 304 can be configured to receive user input and to render output to the user in any suitable format (e.g., visual, audio, tactile, etc.). In some embodiments, user interface component 304 can be configured to generate and serve interface displays to a client device 3 (e.g., a laptop computer, tablet computer, smart phone, etc.), and exchange data via these interface displays. Input data that can be received via various embodiments of user interface component 304 can include, but is not limited to, natural language chat input or prompts, interactions with an HMI development interface (e.g., selection input, drag-and-drop input, alphanumeric input, etc.), or other such input. Output data rendered by various embodiments of user interface component 304 can include natural language responses to chat input or prompts, HMI displays in both design mode and runtime mode, answers to user-submitted questions or requests, HMI development suggestions, or other such outputs.

HMI generation component 306 can be configured to create an HMI project based on design input, including natural language requests or functional descriptions, received via the user interface component 304. HMI deployment component 308 can be configured to commission the HMI application created by the HMI generation component 306 to an appropriate execution platform, such as an HMI terminal Generative AI component 310 can be configured to assist the HMI generation component 306 in generating or analyzing portions of the HMI project—including generating, formatting, and configuring HMI display screens—using generative AI. To this end, the generative AI component 310 can implement prompt engineering functionality using associated custom models 322 trained with domain-specific industrial training data. The generative AI component 310 can generate and submit prompts or meta-prompts to one or more generative AI models and associated neural networks, where these prompts are generated based on natural language requests or queries submitted by the designer as well as domain-specific information contained in the custom models 322. Depending on the nature of the designer's request or query, the responses returned by the generative AI model in response to the prompts can be used by the HMI generation component 306 or the user interface component 304 to generate portions of the HMI project, to render answers to designer's questions about a portion of the HMI project or about the design platform itself. Training component 312 can be configured to train one or more custom models 322 with various types of relevant training data. These custom models 322 are used by the system 302 in connection with generating and customizing portions of an HMI application, as well as generating suitable prompts to a generative AI model as needed to assist with this HMI development.

The one or more processors 318 can perform one or more of the functions described herein with reference to the systems and/or methods disclosed. Memory 320 can be a computer-readable storage medium storing computer-executable instructions and/or information for performing the functions described herein with reference to the systems and/or methods disclosed.

Figure 4:
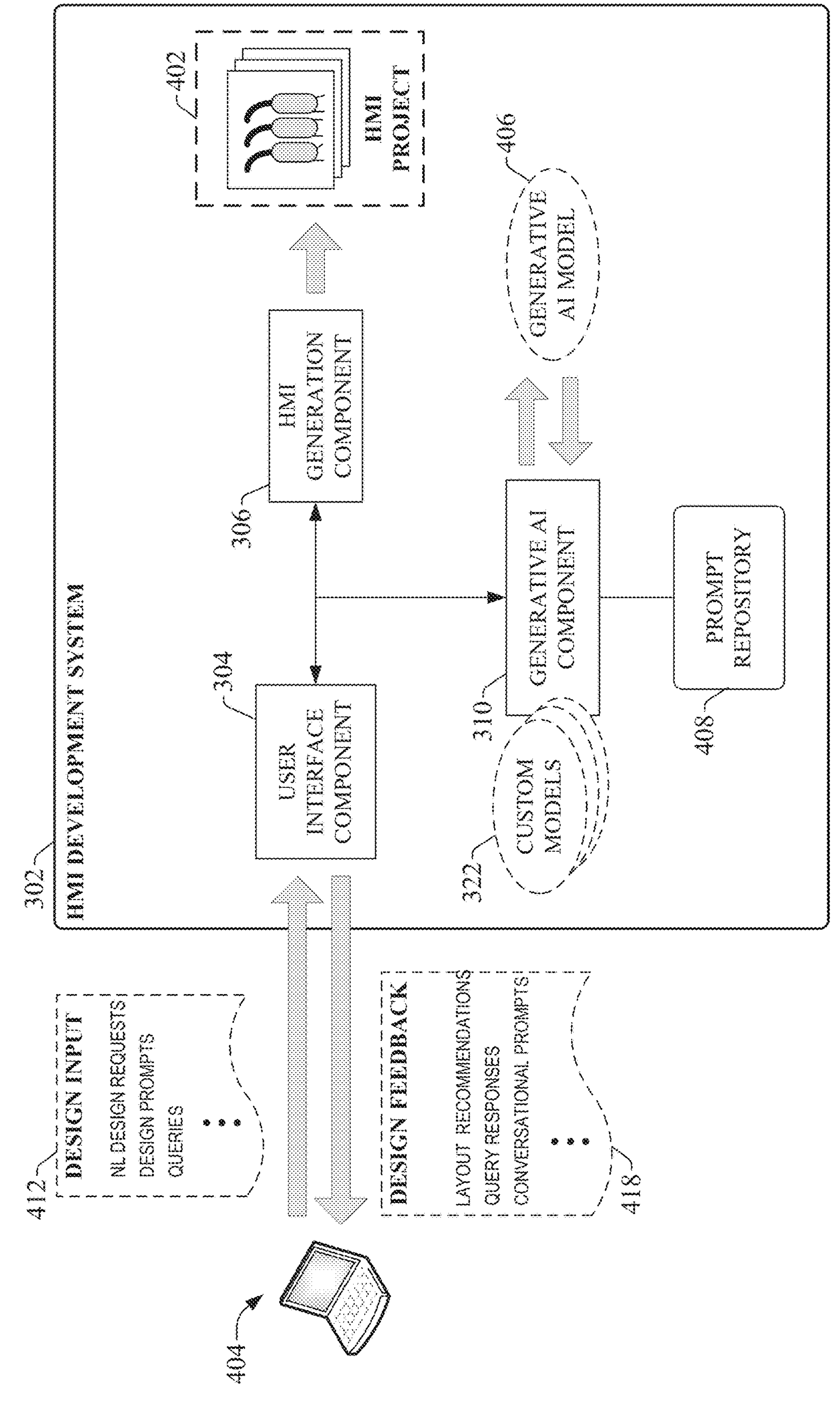
FIG. 4 is a diagram illustrating example data flows associated with creation of an HMI project using the HMI development system.

FIG. 4 is a diagram illustrating example data flows associated with creation of an HMI project 402 using the HMI development system 302 according to one or more embodiments. Some embodiments of the HMI development system 302 can be implemented on a cloud platform and made accessible to multiple industrial customers having authorized access to use the HMI development system's services. Cloud-based implementations can also facilitate collaborative project development whereby multiple developers contribute design and programming input to a common HMI project 402. Alternatively, some embodiments of HMI development system 302 may execute at least partially on a local client device while accessing remote services and repositories as needed.

A client device 404 (e.g., a laptop computer, tablet computer, desktop computer, mobile device, wearable AR/VR appliance, etc.) owned by a user with suitable authentication credentials can access the HMI development system's project development tools and leverage these tools to create an HMI project 402—including display screen definitions, layouts of graphical elements on the display screens, screen navigation structures, animation definitions for graphical elements, links to data tags whose value drive the animations, or other such aspects of an HMI project 402—for visualizing status and operational information for an industrial automation system. Through interaction with development interfaces generated by the system's user interface component 304 and delivered to the client device 404, developers can submit design input 412 to the HMI development system 302 in various supported formats. Design input 412 can include explicit HMI design input such as menu-driven screen creation, graphic element selection and placement (e.g., via drag-and-drop interactions with the development interfaces), manual definition of animation properties and data links, and other such input 412.

Additionally, the HMI system's development services can include a chat-based interface and associated natural language processing services that leverage generative AI to assist the user in creating, editing, or customizing an HMI project 402 for an industrial application, as well as to search for answers to specific questions relating to the HMI project 402 or to the HMI development platform itself. To this end, the HMI development system 302 can include a generative AI component 310 that responds to natural language prompts submitted by the user as part of design input 412. These prompts can comprise, for example, natural language descriptions of desired visualization layouts, screen navigation definitions, graphical content to be included on a display screen and the screen locations at which the content is to reside, alarm requirements, data sources or tags that are to control the animation properties of selected graphical objects, questions regarding development tools supported by the HMI development system 302, request for HMI design recommendations, or other such prompts. Depending on the nature of the prompt, the generative AI component 310 can create or edit portions of the HMI project 402, generate development recommendations for consideration by the user, answers to questions about the HM project 402 or about development tools that are available as part of the HMI development system's development platform, or other such content designed to assist the user in developing an HMI project 402.

Figure 5:
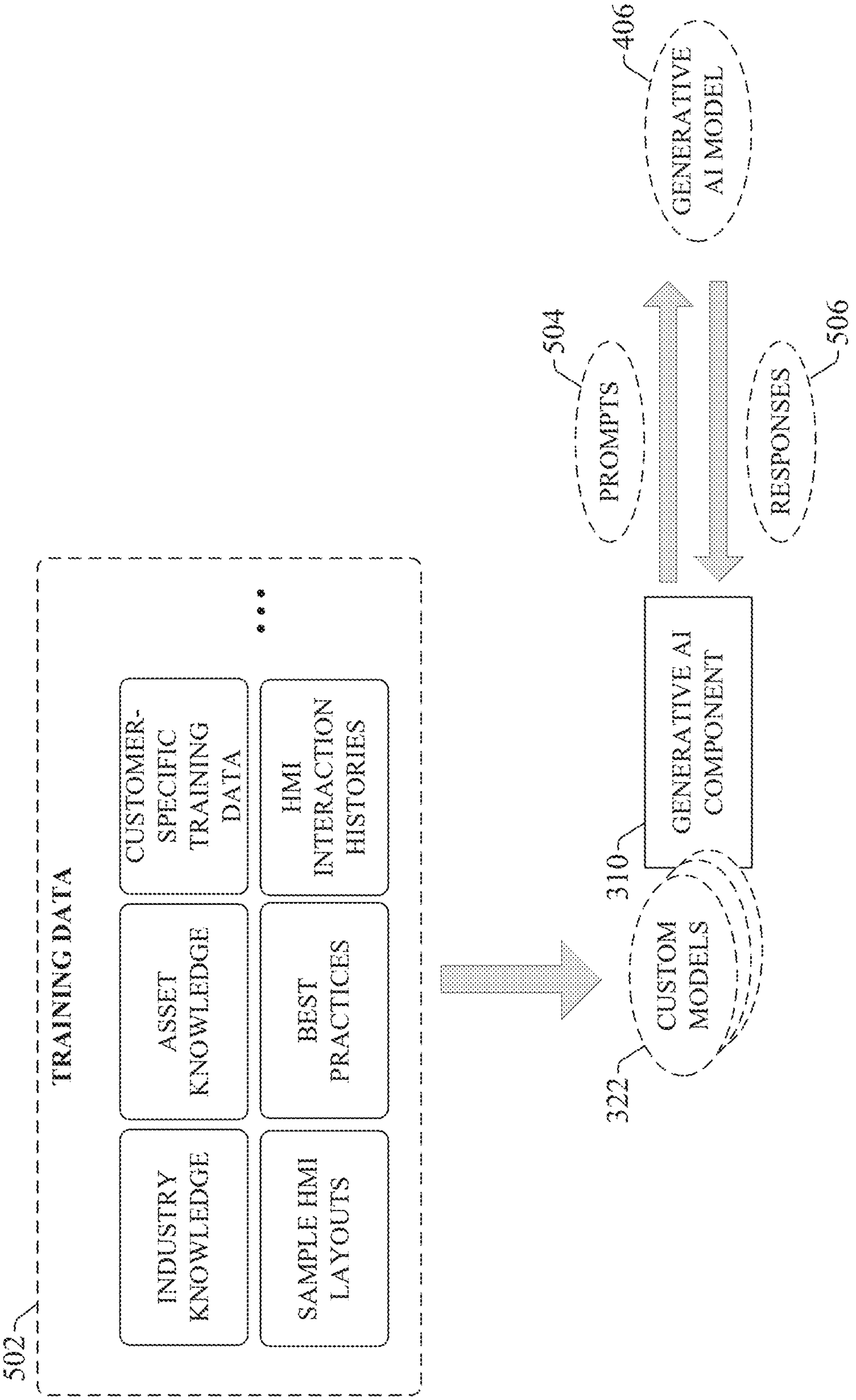
FIG. 5 is a diagram illustrating training of the custom models.

The generative AI component 310 can implement prompt engineering functionality using associated custom models 322 trained with domain-specific industrial training data, and can interface with a generative AI model 406 (e.g., an LLM or another type of model) and associated neural networks. FIG. 5 is a diagram illustrating training of the custom models 322 used by the generative AI component 310. In some embodiments, the generative AI model 406 can reside and execute externally from the HMI development system 302, and the generative AI component 310 can include suitable connectivity tools and protocols, application programming interfaces (APIs), or other such services that allow the generative AI component 310 to exchange prompts and responses with the generative AI model 406. Custom models 322 can be trained using sets of training data 502 representing a range of domain-specific industrial knowledge that can assist the generative AI component 310 in generating or modifying portions of an HMI project 402 in a manner having a high probability of satisfying a user's natural language design descriptions as well as satisfying any application-specific or vertical-specific requirements. Example training data 502 that can be used to train the custom models 322 includes, but is not limited to, information defining industrial standards (e.g., global or vertical-specific safety standards, food and drug standards, design standards such as the ISA-88 standard, etc.), technical specifics or design standards for various types of industrial control applications (e.g., batch control processes, die casting, valve control, agitator control, etc.), knowledge of specific industrial verticals (e.g., automotive, food and beverage, pharmaceuticals, oil and gas, textiles, mining, etc.), knowledge of industrial best practices, technical specifications for various types of industrial devices or assets (e.g., industrial controllers, motor drives such as variable frequency drives, sensors, etc.), control design rules, sample HMI display layouts for various types of control applications or use cases, customer-specific training data describing in-house HMI design preferences or standards (e.g., preferred screen layout formats, preferred types of graphics, preferred text fonts, etc.), or other such training data.

During the project development process, the generative AI component 310 can, as needed, formulate and submit prompts 504 to the generative AI model 406 designed to obtain responses 506 that assist with HMI project development tasks. These prompts 504 are generated based on the user's natural language inputs as well as the industry knowledge and reference data encoded in the trained custom models 322. The generative AI component 310 can reference custom models 322 as needed in connection with processing a user's natural language queries or requests (which may be submitted as design input 412) and prompting the generative AI model 406 for responses 506 that assist the user interface component 304 and HMI generation component 306 in processing these requests and queries.

Returning to FIG. 4, based on the user's design input 412, user interface component 304 can render design feedback 418 designed to assist the developer in connection with developing an HMI project 402. At least some of this design feedback 418 can comprise natural language chat prompts generated by the generative AI component 310 requesting specific items of information from the user (e.g., as part of an iterative dialogue with the user intended to ascertain the user's design requirements), HMI design recommendations (e.g., recommendations for HMI screen layouts or navigation controls), design views of the HMI project 402 being developed, responses to natural language queries submitted by the user about the HMI project 402 or the system's HMI development tools, or other such feedback.

Embodiments of the HMI development system 302 can use prompt engineering services to process natural language design input 412 submitted by the user via the user interface component 304 (e.g., via a spoken word interface or text-based chatbot). These prompt engineering services can leverage the industry knowledge encoded in the custom modules 322 (as learned from training data 502), together with responses 506 prompted from the generative AI model 406, to accurately ascertain the designer's design needs and generate portions of the HMI project 402 to address those needs, or to provide refined answers to design queries.

When a user submits natural language design input 412 describing an HMI design request to the HMI development system 302, the generative AI component 306 analyzes the input 412 based on domain-specific industrial knowledge and design rules encoded in the custom models 322 (that is, the knowledge and rules represented by training data 502). Based on this analysis, and depending on the nature of the design input 412, the generative AI component 306 creates or modifies a portion of the HMI project 402 in a manner that satisfies a design requirement described by the design input 412. In the case of design input 412 comprising a natural language query about the HMI project 402 being edited, or about the system 302 itself, the generative AI component 310 generates and returns, as design feedback 418, a response to the query. This response may be, for example, an answer to a question about HMI project 402 being viewed, guidance as to an appropriate development tool supported by the system 302 that can be used to solve an HMI design problem specified by the query, or other such responses.

In addition to referencing the information contained in the custom models 322, the generative AI component 310 can also, as needed, prompt the generative AI model 406 for responses 506 (see FIG. 5) that assist in formulating suitable HMI designs (or natural language responses) in response to the user's natural language design input 412. For example, in response to receipt of a natural language design request, the generative AI component 310 can determine whether a sufficiently accurate HMI design action (e.g., creation of an HMI project 402, creation or modification of a display screen defined by the project 402, placement of a suitably configured graphical object on the display screen, removal of a graphical object from a display screen, configuration of an animation data link for an animated graphical object, etc.)

can be performed based on relevant information contained in the custom models 322 alone, or, alternatively, whether supplemental information from the generative AI model 406 is necessary in order to determine a suitable a HMI design action having a sufficiently high probability of satisfying the design request described by the natural language design input 412. If supplemental information from the generative AI model 406 is deemed necessary, the generative AI component 310 can formulate prompts 504 based on analysis of the design input 412 and relevant subsets of the industrial knowledge encoded in the custom models 322 (or corresponding subsets of the training data 502). These prompts 504 are designed to obtain responses 506 from the generative AI model 406 that can be used to generate or modify portions of the HMI project 402 in a manner that satisfies the user's natural language design request.

In the case of formulating responses to a user's question about an HMI project 402, or about design tools supported by the HMI development system 302, the generative AI component 310 can aggregate information from the custom models 322 determined to be relevant to the query (e.g., knowledge of common design standards for a type of industrial control application of interest, technical or specification data for industrial assets or devices, industrial design standard information, vertical-specific industrial standards, knowledge of the IDE system's development platform, etc.) with language-specific compositional or syntax information obtained as responses 506 from the generative AI model 406 to formulate a natural language answer to the user's query.

If necessary, the system 302 can also guide iterative natural language chat exchanges with the user if necessary in order to ascertain the user's HMI design request or to improve the probability that the generative AI component 310 will formulate an HMI design action that satisfies the user's design request. For example, the generative AI component 310 can parse an initial natural language design input 412 to determine the type of design requirement being described by the input 412, and refine and contextualize the initial input 412 in a manner expected to assist the custom models 322 or the generative AI model 406 to quickly and accurately arrive at the desired HMI design solution. If the generative AI component 310 determines that additional information from the user would yield a design solution having a higher probability of satisfying the user's initial request (that is, a probability that exceeds a defined threshold), the generative AI component 310 can formulate and render, as design feedback 418, one or more query responses that prompt the user for more refined information that will allow the generative AI component 310 to provide a more complete or accurate HMI design solution to the user's request (that is, a solution estimated to have an accuracy in excess of a defined threshold). Through iterations of such chat exchanges, the generative AI component 310 can collaborate with the user in exploring potential HMI content and configuration variations likely to satisfy the user's needs. The generative AI component 310 can guide these natural language dialogs with the user based in part on learned knowledge of the types of questions that need to be answered in order to generate an HMI project 402, or portions thereof, that align with user's needs.

Users can interact with the system 302 using such iterative natural language dialogs to facilitate incremental design and refinement of an HMI project 402. For example, using natural language design requests submitted as design input 412, the user can initiate creation of a new HMI project 402 and proceed to refine the project 402 by adjusting color schemes (e.g., "Change the background color of the Station #6 screen to grey."), adding or remove machining stations or other graphical elements (e.g., "Add a redundant backup pump in parallel with Pump #6."), relocating or resizing graphical objects (e.g., "Move the Leak Test station to the top of the screen," "Make the tank smaller," etc.), or performing other such refinements. As needed, the generative AI component 310 can guide this refinement process by rendering, as design feedback 418, natural language prompts requesting additional information from the user that may be helpful in converging on a suitable HMI design for the user's control system, or providing suggestions for improving or optimizing the HMI project 402 based on the current design state of the project 402 (e.g., recommendations for rearranging or resizing graphical objects in a manner that makes more efficient use of space, recommendations for modifying the display screen navigation structure for the project 402, etc.).

In addition to allowing the user to submit free-form natural language design input 412, some embodiments of the user interface component 304 can present pre-composed or pre-loaded prompts to the user for selection and submission to the generative AI component 310. These pre-composed prompts can be stored in a prompt repository 408 of the HMI development system 302 and represent questions or development tasks that are commonly submitted by users of the HMI development system 302. In an example scenario, the user interface component 304 may render 10 of the most common questions or requests submitted by users of the system 302 as a list of selectable natural language prompts, where selection of a prompt from the list causes the prompt to be submitted to the generative AI component 310 for processing. If appropriate, the user interface component 304 can allow the user to customize one or more parameters of a selected pre-loaded prompt to accord with a specific need (e.g., by indicating a specific display screen, graphical object, data tag, controller definition, program instruction, or industrial asset to which the selected pre-written prompt is to be directed).

In another example, the generative AI component 310 may determine a general design topic to which a user's initial design input 412 is directed (e.g., creation of a suitable layout of graphical objects on a display screen, design of a suitable screen navigation structure for the HMI project 402, etc.), and select a subset of pre-written prompts from the prompt repository 408 that are determined to be helpful for the design topic. The user interface component 304 can render these prompts on the system's development interface for selection by the user if desired. Selection of a pre-written prompt causes the selected prompt to the submitted to the generative AI component 310 for processing as design input 412.

The generative AI component 310 can use a range of approaches for processing natural language design input 412 submitted by the user, and for formulating prompts 504 to the generative AI model 406 designed to yield responses 406 that assist with the user's design request. According to an example approach, the generative AI component 310 can access an archive of chat exchanges between the generative AI component 310 and other users of the system 302, and identify chat sessions that were initiated by user queries having similarities to the initial design input 412 submitted by the present user. Upon identifying these archived chat sessions, the generative AI component 310 can analyze these past chat sessions to determine types of design actions that were ultimately performed by the system 302 on an HMI project 402 as a result of these sessions (e.g., creation or configuration of a display screen having content that is a function of specific keywords of the user's query, addition of a certain type of graphical object to a display screen, configuration of a data link that is to control an animation property of a graphical object, adding a controller definition to the HMI project 402 defining a controller with which the project 402 is to exchange data, etc.), and update the HMI project 402 based on the results of these past chat sessions and adapted to the user's initial request, or, if necessary.

Analysis of these archived chat sessions, as well as any other relevant industrial knowledge or expertise encoded in the custom models 322, can also assist the generative AI component 310 in inferring the user's needs from an initially vaguely worded natural language design input 412, and to modify the design of the HMI project 402 in a manner that addresses these needs. If the generative AI component 310 determines that supplemental information from the generative AI model 406 is necessary to determine a design modification to the HMI project 402 having a sufficiently high probability of satisfying the user's request, the generative AI component 310 can also formulate a prompt 504 designed to prompt the generative AI model 406 for at least a portion of the information inferred to be of interest to the user. This may include, for example, formulating the prompt 504 to request, from the generative AI model 406, a specific type of information that may not have been specified in the user's design input 412 but which the generative AI component 310 ascertained to be the information that would address the user's needs. In this way, the generative AI component 310 and its associated custom models 322 can actively frame a user's natural language design input 412 in a manner that quickly and accurately leads the generative AI model 406 to the user's desired HMI design solution (e.g., generation of an HMI project 402 satisfying design requirements implied by the natural language design input 412).

In another example approach, the generative AI component 310 can enhance the user's natural language design input 412 with additional information from the custom models 322 that contextualizes the user's request, and integrate this additional information with the user's request to yield the prompt 504 submitted to the generative AI model 406. The types of additional contextual information added to the design input 412 can depend on the nature of the design request and can include, but are not limited to, information obtained from vendor knowledgebases or device documentation for industrial devices known to be relevant to the user's design request.

Various example HMI design actions—e.g., HMI project creation and editing actions—that can be performed by the system 302 based on processing of a user's natural language design input 412 are now described. In general, the system 302 can perform substantially any type of HMI project creation, development, and editing action based on, and in accordance with, natural language requests or design descriptions submitted as design input 412. For example, in response to receipt of a natural language request to create a new HMI project 402 (e.g., "Create a new project"), the HMI generation component 306 (with the assistance of the generative AI component 310 as needed) can initiate a new HMI project 402 within the system's development environment. As noted above, this natural language design input 412 can be submitted to the system 302 as typed or spoken natural language text, which may be entered via a chatbot interface or another type of natural language dialog interface rendered by the user interface component 304.

As part of this initial request to create an HMI project 402 or via subsequent separate natural language design requests, the user can submit natural design requirements or configuration requests directed to the newly created HMI project 402. Example HMI design actions that can be performed by the system 302 based on such natural language design inputs 412 can include, but are not limited to, creating an HMI project 402, defining display screens that make up the HMI project 402, defining navigation schemas or controls for navigating between the display screens (including adding graphical navigation controls to selected display screens and defining which other display screens these navigation controls will invoke), selecting and adding both static and animated graphical objects to the display screens, defining animation controls for animated graphical elements (including specifying a data tag of an industrial controller or another data source that is to control an animated state of a graphical object), specifying layouts or locations of the graphical objects on the display screens, defining color schemes for display screens, defining conditions that are to trigger alarms (e.g., a high or low limit of a specified data tag that is to trigger a high level or low level alarm), defining the text of respective alarms, defining multiple versions of a given HMI project 402 to be used under different environmental conditions (e.g., bright light conditions, outdoor use, high-particulate environments, etc.), defining scripts to be triggered in response to specified conditions detected by the HMI during runtime, naming display screens or graphical objects, adding a controller definition to the HMI project 402 that defines an industrial controller with which the HMI will be exchanging data values, or defining other such properties of the HMI project 402.

For example, a user may submit, as an example natural language design input 412, "Create a new project, with left nav, top right help and login, alarm summary centered on the top and company logo on the left. Create three sub-areas, alarms history, top ten alarms, across all units." The generative AI component 310 can analyze this input 412, leveraging industry or application knowledge encoded in the custom models 322 as well as responses 506 prompted from the generative AI model 406 as needed, to determine or infer the user's HMI design requirements and instruct the HMI generation component 306 to create or edit the HMI project 402 in a manner that satisfies these requirements. In this example, the HMI generation component 306 will define an HMI project 402 in which a display screen is defined, a navigation button control is added to the left side of the screen, help and login button controls are added to the top right corner of the screen, an alarm summary is centered near the top of the screen, and a company logo is added to the left side of the screen.

A user's natural language design input 412 can include explicit references to portions or elements of the HMI project 402 as needed in order to describe an HMI configuration action to be performed. These references can include display screen names (e.g., "Add a button for navigating to the Overview screen to the bottom left of the Line 1 screen."), names or identities of graphical elements or the properties thereof (e.g., "Set the OPEN state color of the #1 Valve graphic to green and link it to the ValveOpen tag of Controller1."), or other such explicit references.

In some scenarios, rather the submitting natural language design input 412 describing HMI configuration actions with explicit reference to elements or configuration functions of the HMI project 402 itself, the user may submit natural language design input 412 describing in more general terms—that is, without reference to specific elements of an HMI project 402—visualization requirements of an industrial automation system for which an HMI project 402 is required. According to this approach, the user may describe, via natural language design input 412, industrial assets, devices, or machines that are part of an automation system and that are to be visualized on the HMI (e.g., tanks, valves, stamping presses, conveyors, machining stations, etc.), functional relationships between the assets (e.g., "I need a tank called Tank #1 that feeds material to another tank called Tank #2 via an inlet valve called Valve #1"), and information about the assets that the user wishes to visualize ("Show me the states of the valves and the fill levels of the tanks."). The user may also provide other specifics about the assets or application, such as the capacities of the tanks, maximum flow rates between the tanks, or other relevant information about the assets. The HMI generation component 306, assisted by the generative AI component 310, can process these functional descriptions to determine the user's visualization requirements and develop the HMI project 402 to fulfil these requirements. Development actions performed by the system 302 in response to this natural language design input 412 can include adding suitable graphical objects to the HMI's display screens, arranging these graphical objects in a manner that reflects the functional relationships between the assets represented by the graphical objects, determining and configuring data links between animation properties of these objects and corresponding controller data tags, or other such HMI development functions.

In other example scenarios, the user's natural language design input 412 may describe the type of industrial automation system or control application to be visualized, together with application-specific details of the user's system that can be used by the system 302 to create and customize a suitable HMI project 402 for the automation system. For example, the user may specify, via natural language design input 412, that an HMI is required for a batch process for producing a specified type of material (e.g., a plastic, a chemical, a medication, etc.). This design input 412 can describe any functional details that can be used by the generative AI component 310 and HMI generation component 306 to determine suitable graphical content, layouts, and animations for visualizing the control application.

The generative AI component 310 can formulate a suitable HMI configuration action in response to any of the various types of natural language design input 412 described above based in part on industry-specific knowledge encoded in the custom models 322 (or the underlying training data 502). The industry knowledge encoded in the custom models 322 can assist the generative AI component 310 and HMI generation component 306 in determining a preferred or standards-compliant configuration for the HMI project 402 that also satisfies the user's design requirements as specified in the natural language design input 412. This encoded knowledge can reduce the burden on the user to provide highly granular details of the control application or automation system for which the HMI is being designed, since the system 302 can leverage domain-specific knowledge recorded in the custom models 322 to infer the user's needs and to formulate suitable HMI designs that satisfy these inferred needs.

For example, some of the training data 502 used to train the custom models 322 can include knowledge of standard or common system designs for respective different types of industrial control applications (e.g., batch processing applications, die casting applications, material handling applications, machining applications, etc.). This knowledge can comprise the types, numbers, and configurations of respective types of industrial assets typically used in such applications (e.g., machines, monitoring and control devices, conveyors, machining stations, vats or tanks, piping, ovens, presses, etc.), functional relationships between these assets (e.g., the arrangements of the assets, the direction and order of part or material flow through the assets, etc.), or other such domain-specific knowledge. In response to receipt of a user's natural language design input 412 describing a functional requirement for visualizing an automation system designed to implement a specific type of industrial control application, the generative AI component 310 can access relevant domain-specific information about the specified type of control application from the custom models 322 and use this information in connection with formulating aspects of an HMI design having a high probability of satisfying the requirements described by the user's natural language design input 412. This can include, for example, inferring a collection of industrial assets having a high likelihood of being part of the automation system to be visualized (e.g., based on the type of control application or industrial vertical described by the user's design input 412) and generating an HMI project 402 having a display screen with a preliminary layout of graphical objects representing these assets. In such scenarios, the generative AI component 310 and HMI generation component 306 can infer a suitable set of graphical asset representations, and arrangements of these graphical representations, even if the user's natural language design input 412 did not specify the identities or types of assets that will make up the automation system.

In some embodiments, the custom models 322 can be trained with information about specific custom-built machines, such as a machine or production line built for the customer by an OEM, or the custom models 322 may include pre-trained models provided by the OEM. This machine-specific training data 502 can include, for example, names and functions of work stations that make up the machine or line (e.g., tooling stations, quality check stations, ovens, etc.), the identities and arrangements of components that make up the machine (e.g., valves, vats, pumps, industrial robots, pushers, stoppers, etc.) specification data for the machine, or other such information. The generative AI component 310 can leverage the machine-specific information used to train these models 322 to suitably configure an HMI project 402 for visualizing this custom machine in accordance with a user's design input 412. Custom models 322 trained with machine-specific training data 502 for machines known to be deployed at the customer facility can assist the HMI development system 302 in generating an HMI project 402 that accurately reflects the customer's equipment with relatively little design input 412 required from the user.

By supporting HMI development using natural language design input 412 describing functional requirements of the HMI project 402 at varying degrees of granularity or specificity, the HMI development system 302 can allow users of various roles within the industrial enterprise to contribute to the design of HMI projects 402, including plant engineers or controls engineers who design the corresponding automation system, maintenance staff who will be maintaining and troubleshooting the automation system, and machine operators who will be operating the automation system. These various user roles may require different information presentations from the HMI project 402, and members of these roles can ensure that the HMI project 402 caters to these role-specific needs by providing natural language design input 412 describing these role-specific requirements at various levels of specificity. For example, control engineers may submit natural language design input 412 describing visual requirements in terms of the specific equipment or device names, explicitly identified controller data tags that are to drive the animation properties of graphical objects, or other technical language and references that may not be familiar to machine operators. Additionally, machine operators may be invited to contribute natural language design input 412 describing their HMI requirements in terms information that they wish to see and how they would like to see this information organized (e.g., "I'd like to see the tank fill level and outlet flow rate on the same screen."). In all these scenarios, the system 302 can process these natural language inputs, leveraging the domain-specific knowledge encoded in the custom models 322 and responses from the generative AI model 406 as needed, to implement development actions on the HMI project 402 that are expected to satisfy the requirements of these various users.

The system 302 can support multi-user collaborative development of the HMI project 402, receiving natural language design input 412 from users having these various roles. In some such collaborative development scenarios in which users of various roles contribute to the development of an HMI project 402, some embodiments of the system 302 can process design input 412 directed to the HMI project 402 as a function of the role of the user from whom the design input 412 was received. For example, some embodiments of the HMI development system 302 may create multiple versions of an HMI project 402 being developed for a given automation system, where each version of the project 402 is created using design input 412 received from users of a single common role (e.g., machine or line operator, plant engineer, maintenance personnel, etc.). This yields multiple versions of the HMI project 402 that are specific to respective different user roles, and which can be invoked during runtime by users having those roles. In this way, the system 302 allows users of different roles to create versions of the HMI project 402 catered to their role-specific requirements.

Alternatively, the HMI generation component 306 can integrate design input 412 from multiple users of different roles into a single HMI project 402 that satisfies all requirements specified by the multi-user design input 412. In some such embodiments, the system 302 may prioritize design requests of one role over another role if requests from these roles conflict with each other. For example, if the system 302 determines that design input 412 received from a plant engineer is in conflict with design input 412 submitted by a machine operator (e.g., in terms of placement or orientation of graphical objects, color schemes, content to be included or omitted from the HMI, etc.), the system 302 may opt to implement the plant engineer's design input 412 in the HMI project 402 while overriding the design input 412 received from the machine operator.

In a related aspect, the generative AI component 310 can infer the user's level of expertise based on the wording of the natural language design input 412, and formulate design feedback 418 (e.g., follow-up questions regarding the user's design request, answers to questions about the HMI design or the development tools offered by the system 302) based on this inferred level of expertise. The user's level of expertise can be inferred, for example, based on a determination of whether the words, phrases, or terms used to in the design input 412 are likely to be used by one of relatively advanced expertise who can be expected to understand more technically advanced design feedback 418 or, alternatively, a layman who may require more fundamental information included in the feedback 418.

For users at these various levels of expertise, the generative AI component 310 can word any design feedback 418 or responses to the design input 412—including responses prompting the user for additional information to assist the system 302 in determining suitable HMI development actions having a likelihood of satisfying the user's request—at a level deemed appropriate to the user's inferred level of presumed understanding. This can affect the choice of words used in the feedback 418, as well as the granularity of the response's content.

Some embodiments of the HMI development system 302 can also be configured to process design input 412 comprising various types of design documentation that was generated as part of the design process for the automation system to be visualized. For example, the user may submit, as design input 412, digital design drawings (e.g., computer-aided design (CAD) drawings) of the automation system or machine for which an HMI project 402 is required. Example CAD drawings that can be submitted as design input 412 can include electrical drawings, I/O drawings, mechanical drawings, panel layout drawings, or other such documentation. The generative AI component 310, assisted by the custom models 322 or responses prompted from the generative AI model 406, can determine suitable content and formatting for a corresponding HMI project 402 based on analysis of these drawings, and generate an HMI project 402 having this content and formatting.

In an example scenario, the generative AI component 310 can identify types of machines or devices included in the automation system, as well as communicative or functional relationships between these machines and devices, based on analysis of I/O drawings, mechanical drawings, or electrical drawings for the automation system. The generative AI component 310 can also infer a type of industrial process being carried out by the automation system based on analysis of these drawings. Also, based on knowledge of the types of information that is typically of interest to operators for the inferred type of industrial application (as encoded in the custom models 322, or based on analysis of other archived HMI applications for similar types of industrial applications), the generative AI component 310 can instruct the HMI generation component 306 to generate an HMI project 402 containing graphical objects representing a subset of the machines or devices that are known to typically be of interest (e.g., tanks, valves, motors, conveyors, etc.), and organized to represent the functional relationships between the machines or devices. HMI generation component 306 can also define data links between the animation properties of these graphical objects and their corresponding data tags or addresses in the industrial controller that will be monitoring and controlling the automation system (as determined, for example, from the I/O drawings).

Figure 6:
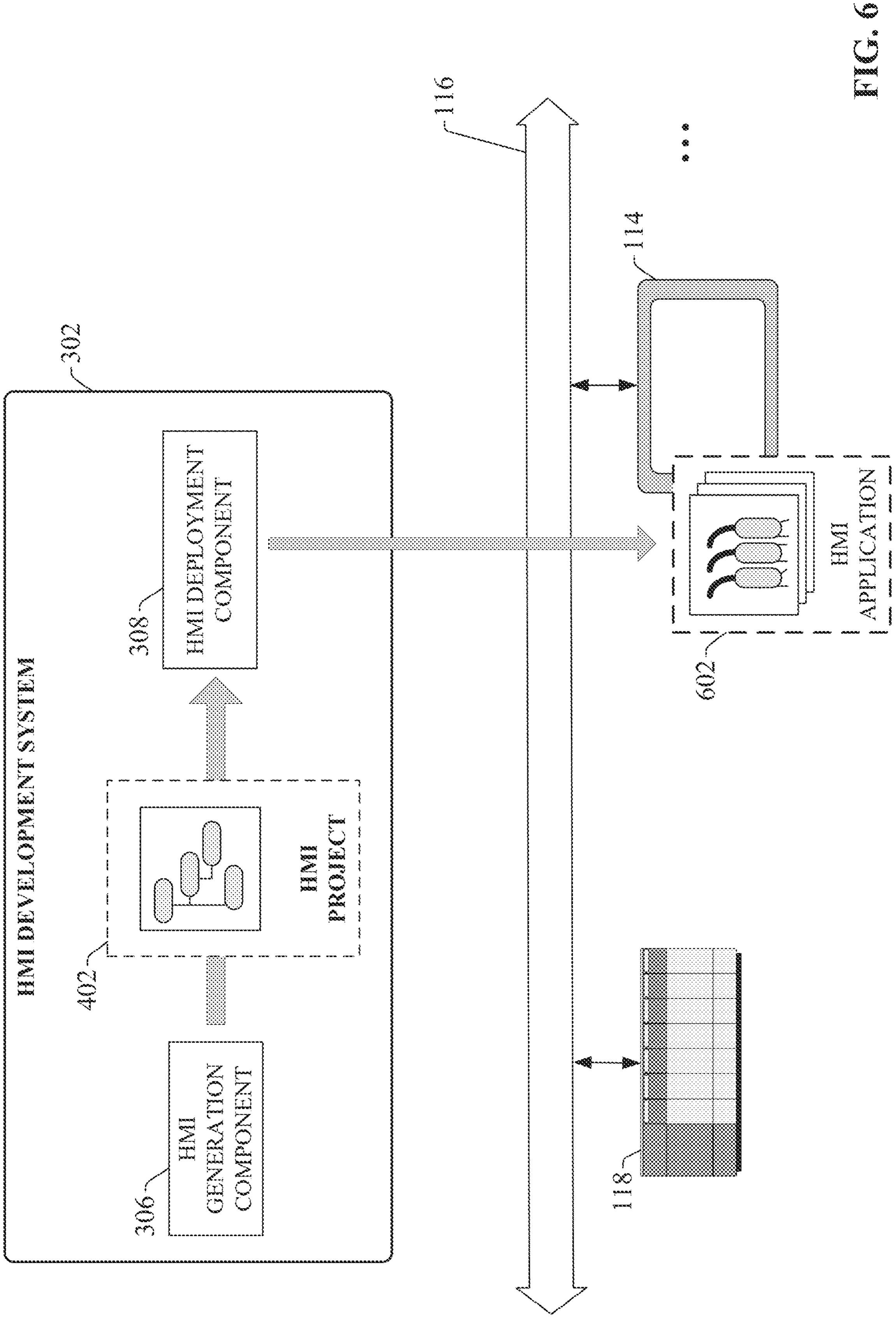
FIG. 6 is a diagram illustrating commissioning of an HMI application to an HMI terminal.

Once development on an HMI project 402 has been completed and the HMI generation component 306, the HMI project 402 can be deployed to an HMI terminal 114 or other computing platform with display capabilities for execution. FIG. 6 is a diagram illustrating commissioning of an HMI project 402 to an HMI terminal 114. The system's HMI deployment component 308 can communicatively interface with an HMI terminal 114 via either a direct connection between the HMI development system 302 and the terminal 114 or, in the case of embodiments of the system 302 that execute on a cloud platform or other remote platform, via a remote connection to the terminal 114. When executed on the HMI terminal 114, the complied HMI application 602 renders an HMI having the display screens and associated graphical elements and behaviors defined by design input 412 and at least partially generated and configured based on processing of the developer's natural language prompts. In cases in which the HMI project 402 also defines communication parameters for the HMI terminal 114 itself, execution of the HMI application 602 will set the terminal's networking or communication settings in accordance with the communication settings defined in the HMI project 402. This may include, for example, setting the terminal's networking parameters to operate on the plant network 116 as well as setting the HMI's communication settings so that the terminal 114 will communicate with the industrial devices (such as controller 118) with which the HMI terminal 114 will exchange data.

Figure 7:
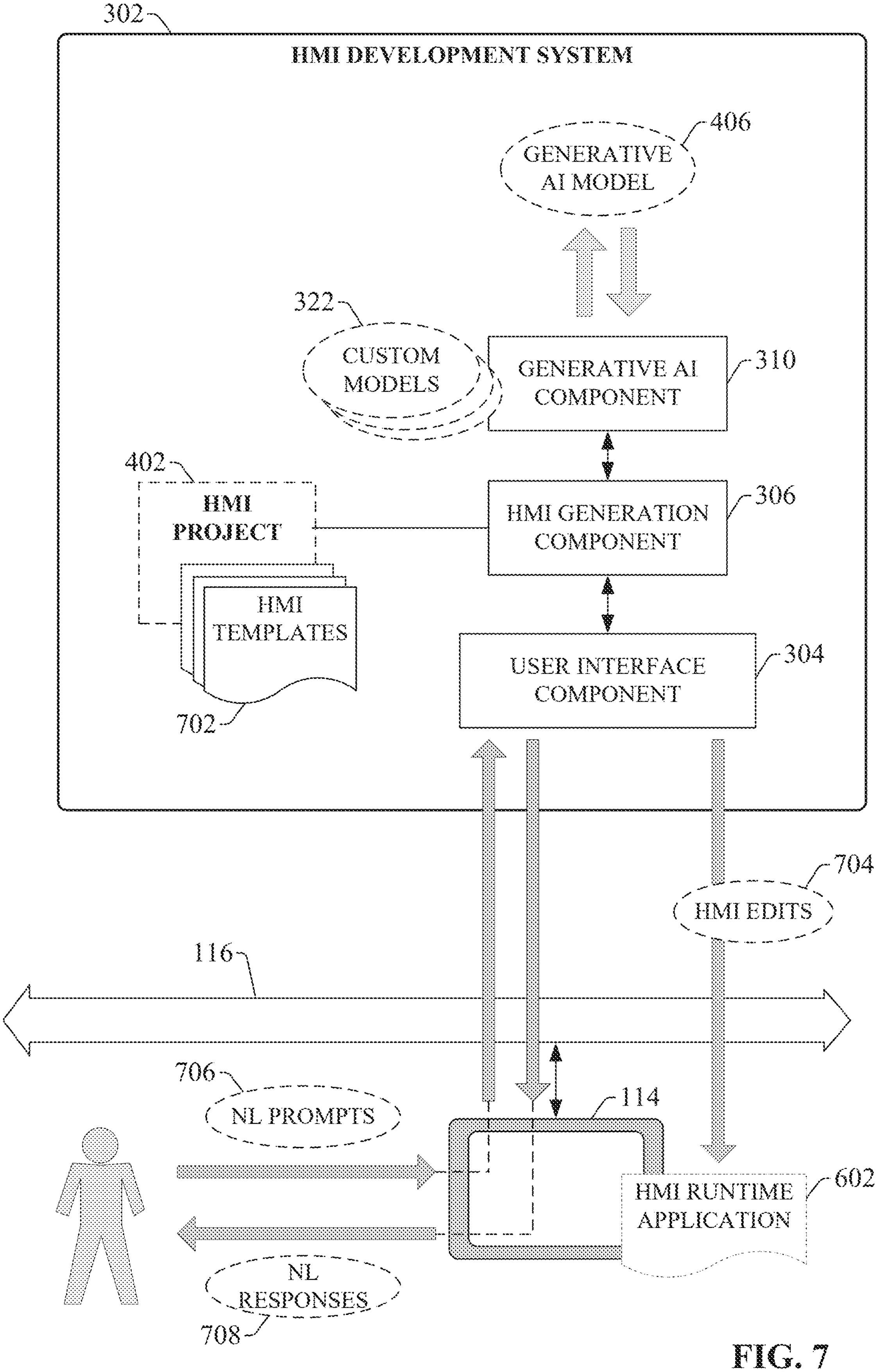
FIG. 7 is a diagram illustrating use of the HMI development system to implement dynamic edits to an HMI application during runtime using natural language prompts.

After deployment of an HMI project 402 as a runtime application 602, some embodiments of the HMI development system 302 can also support dynamic runtime modifications to the resulting HMI application 602 using natural language prompts. FIG. 7 is a diagram illustrating use of the HMI development system 302 to implement dynamic edits 704 to the HMI application 602 during runtime using natural language prompts 706. At any time during runtime operation of the HMI application 602, an operator or other user can submit a natural language prompt 706 to the application 602 requesting a modification to a visual aspect of the HMI application 602. These natural language prompts 706 can be submitted via a text-based or verbal chat interface integrated into the HMI application 602, and are then routed to the HMI development system 302 for processing. The generative AI component 310 can process these natural language prompts 706 to determine the nature of the modification being requested by the user, and return HMI edits 704 that implement the requested modification on the HMI application 602.

In an example scenario, the user may indicate, via a natural language prompt 706, that the display screens rendered by the HMI application 602 are difficult to see due to environmental conditions of the area in which the HMI is being used, such as bright ambient light or relative darkness. The prompt 706 may specify the nature of the visual difficulty—e.g., "I can't see the screens in this bright light," "This control room is dark, can you brighten up the display?"—and based on assessment of this prompt 706 the generative AI component 310 can make an adjustment to the application 602 or to the HMI terminal 114 itself to correct the issue (e.g., by setting a brightness or contrast level to counteract bright ambient conditions). Another example prompt 706 may request a countermeasure for a visual impairment (e.g., "I can't see blues in this environment, can we correct that?" "I can't see yellow very well, can you pick an alternative color?"), and in response to such prompts 706 the generative AI component 310 can determine and implement a suitable countermeasure for compensating for the indicated impairment (e.g., adjusting the brightness, contrast, or color choices on the HMI's displays).

Natural language prompts 706 can also be used to alter the content of the displays rendered by the HMI application. For example, the user may submit a natural language prompt 706 requesting that a graphical element, such as an animated graphical object or a numerical value, be added or removed from the currently rendered display. In response to receipt and processing of this prompt, the generative AI component 310 will return an HMI edit 704 that implements the indicated modification on the HMI application 602.

Users can also use natural language prompts 706 to dynamically create new customized display screens as needed. For example, a given machine operator may wish to aggregate graphical objects that are currently distributed across multiple different screens onto a single new display screen. To achieve this, the operator can submit a natural language prompt 706 describing the content that the operator wishes to see (e.g., "Get me the valve from Display 2, the pump from Display 3, and build me a new display."), and based on translation of this prompt 706 the generative AI component will return an HMI edit 704 that creates and adds a screen having the described content to the HMI application 602.

The system 302 can also process natural language prompts 706 that, rather than explicitly identifying the content that the operator wishes to see in terms of specific graphical objects, describes the functionality that the operator wishes to see in more abstract terms. For example, a natural language prompt 706 may indicate that the operator wishes to see a display that assists in calibrating a valve's open and closed conditions (e.g., "Give me a screen for calibrating Valve #2"). Based on analysis of this prompt 706, industry knowledge encoded in the custom models 322 (which may include knowledge of the types of information known to be helpful in performing such calibrations), and analysis of the HMI application 602 itself, the generative AI component 310 can determine suitable content and associated data links (that is, links to appropriate controller data tags or other sources of required data) expected to be useful for performing the valve calibration, and return an edit 704 that creates a new screen that includes this content. In some cases, content for the new screen may be drawn from other screens already defined in the HMI application 602.

As in the design time scenario, the system 302 can also leverage pre-loaded or pre-written prompts during runtime of the HMI application 602. For example, the generative AI component 310 can retrieve selected pre-composed prompts from the prompt repository 408 when appropriate and present these pre-composed prompts to the user via the HMI application 602 for selection and processing by the generative AI component 310. The generative AI component 310 can select a suitable subset of pre-composed prompts for presentation to the user based on a current condition of the HMI application 602 or its associated automation system, or based on a pattern of the user's interactions with the HMI application 602. For example, the generative AI component 310 may determine, based on the user's interactions with the HMI application 602, that the user is attempting to perform a particular operational task. Based on this determination, the generative AI component 310 may select and render a subset of pre-composed prompts from the prompt repository 408 determined to be relevant to the operational task. Selection of one of these pre-written prompts by the user can cause the selected prompt to be processed by the generative AI component 310.

In some embodiments, after the system 302 has implemented a dynamic runtime modification to the HMI application 602 in accordance with a user's natural language prompt 706, the user may submit a request to save the resulting modified version of the HMI application 602 as a template 702 to be stored with the HMI project 402 from which the runtime HMI application 602 was compiled. Each template 702 represents a version of the base HMI project 402 that has been modified in accordance with a given set of natural language prompts 706 as described above, and can be given a name or other type of identifier to distinguish the template 702 from other template 702 associated with the project 402. Users can invoke a selected template via interaction with the HMI application 602; e.g., by requesting a selected template via a natural language prompt 706. When a selected template 702 is invoked, the user interface component 304 can modify the HMI application 602 currently executing on the HMI terminal 114 in accordance with the selected template 702. In another example scenario, a template 702 may record dynamic modifications that were made to the HMI application 602 to render the HMI more suitable for a given environment, context, or user. These may include modifications to adapt the HMI to a bright light environment, a dark environment, a user with visual impairments, or other such contextual considerations. The system 302 can invoke one of these templates 702 either in response to an explicit request to adapt the HMI application 602 in accordance with the selected template 702 or automatically in response to a determination by the system 302 that the contextual condition for which the template 702 was created is currently active.

As another runtime feature, the HMI development system 302 can also process natural language prompts 706 comprising questions about the HMI application 602 itself or about current operation of the automation system being visualized by the application 602. For example, the user may submit a natural language prompt 706 requesting assistance in diagnosing a performance issue with the automation system being visualized, or an active alarm that has been generated by the HMI application 602. Such prompts 706 may, for example, request a suggested countermeasure for addressing a current alarm condition being reported by the HMI or a performance issue observed by the operator and described by the prompt 706. In response to such prompts 706, the generative AI component 310 can formulate a natural language response 708 to the prompt 706 based on the nature of the question described by the prompt 706, as well as one or more of knowledge of the specific automation system and its components as encoded in the custom models 322 (e.g., if one of the custom models 322 is a machine-specific model, such as a model provided by an OEM), more general knowledge encoded in the custom models 322 about the type of industrial application being carried out by the automation system, or responses 506 prompted from the generative AI model 406. The system 302 can render the resulting natural language responses 708 on the HMI via the chat interface used to submit the prompt 706. Depending on the nature of the user's query, these responses 708 may describe recommended workflows for addressing the alarm condition or performance issue, answer questions regarding the nature of the alarm or issue, or other such information. The ability to process chat-based queries regarding alarm conditions or performance concerns can streamline the diagnostic process and assist machine operators or other plant personnel in quickly resolving performance problems.

In some embodiments, system 302 can further refine this diagnostic process by monitoring the workflows or HMI interaction patterns of machine operators or engineers in response to specific alarm conditions or performance issues and, based on these observed interaction patterns, training one or more of the custom models 322 with knowledge of learned workflows that are known to successfully resolve these performance issues. The generative AI component 310 can then use these trained models 322 to generate, as natural language responses 708, recommendations for addressing similar types of alarms or performance issues. For example, the generative AI component 310 may determine that, when a given alarm condition is triggered on the HMI, the corresponding alarm is resolved most quickly or effectively when operators perform a particular set of interactions with the HMI and the automation system (e.g., navigating to a particular display screen, changing a state of a binary tag or a value of a setpoint via an HMI interaction, performing a sequence of control panel or HMI interactions, clearing parts from a work station of the automation system, etc.). Accordingly, the training component 312 can train one or more of the custom models 322 with this learned optimal interaction pattern. If the alarm is triggered in subsequent operating schedules, the generative AI component 310 can leverage these updated trained models 322 to generate and render a natural language response 708 describing the actions to be taken by the operator to address the alarm condition. This guidance can be rendered either in response to detection of the alarm condition or in response to a request from the operator (submitted as a natural language prompt 706) for assistance in addressing the alarm.

Since the system 302 can track and record the interaction patterns of different operators during runtime, the system 302 can present these past user interaction patterns in response a user's natural language prompt 706. For example, if the automation system experiences an alarm condition or performance issue that the current machine operator is not familiar with, the operator may submit a natural language prompt 706 asking for assistance in addressing the issue, either by expressly requesting previous interaction patterns that were performed by other operators to successfully address the issue or by requesting assistance with the issue more generally. In response to such prompts 706, the generative AI component 310 can retrieve information regarding one or more past interaction sequences known to have successfully mitigated the alarm condition or performance issue and render this information on the HMI. An interaction sequence can comprise an ordered sequence of actions performed by previous operators to address the issue, where these actions may include interactions with the HMI (e.g., navigations to specific displays screens, interactions with specific HMI controls such as graphical push buttons or data entry fields, etc.), interactions with the automation system's control panel (e.g., pressing a pushbutton, setting a position of a selector switch, placing the automation system in a particular operating mode, manually moving the automation system's machine components to their home position, etc.), or another interaction with the automation system that is detectable by the system 302 (e.g., clearing parts or debris from a location on the automation system's conveyor that is monitored by a presence sensor). In response to a request for these past interactions, the system's user interface component 304 can render information about these past interactions on the HMI in any suitable format, including but not limited to a natural language description of these interactions or a graphical demonstration that visualizes the interactions.

In another example, rather than requesting a recommended set of interactions for addressing a specific alarm or performance issue, a user may submit a natural language prompt 706 requesting information on all interactions that were performed on the HMI and its associated automation system a given range of time (e.g., interactions for the previous work shift, interactions for the past six hours, etc.), and the system 302 can formulate and render a description of these interactions via the HMI.

Figure 8A:
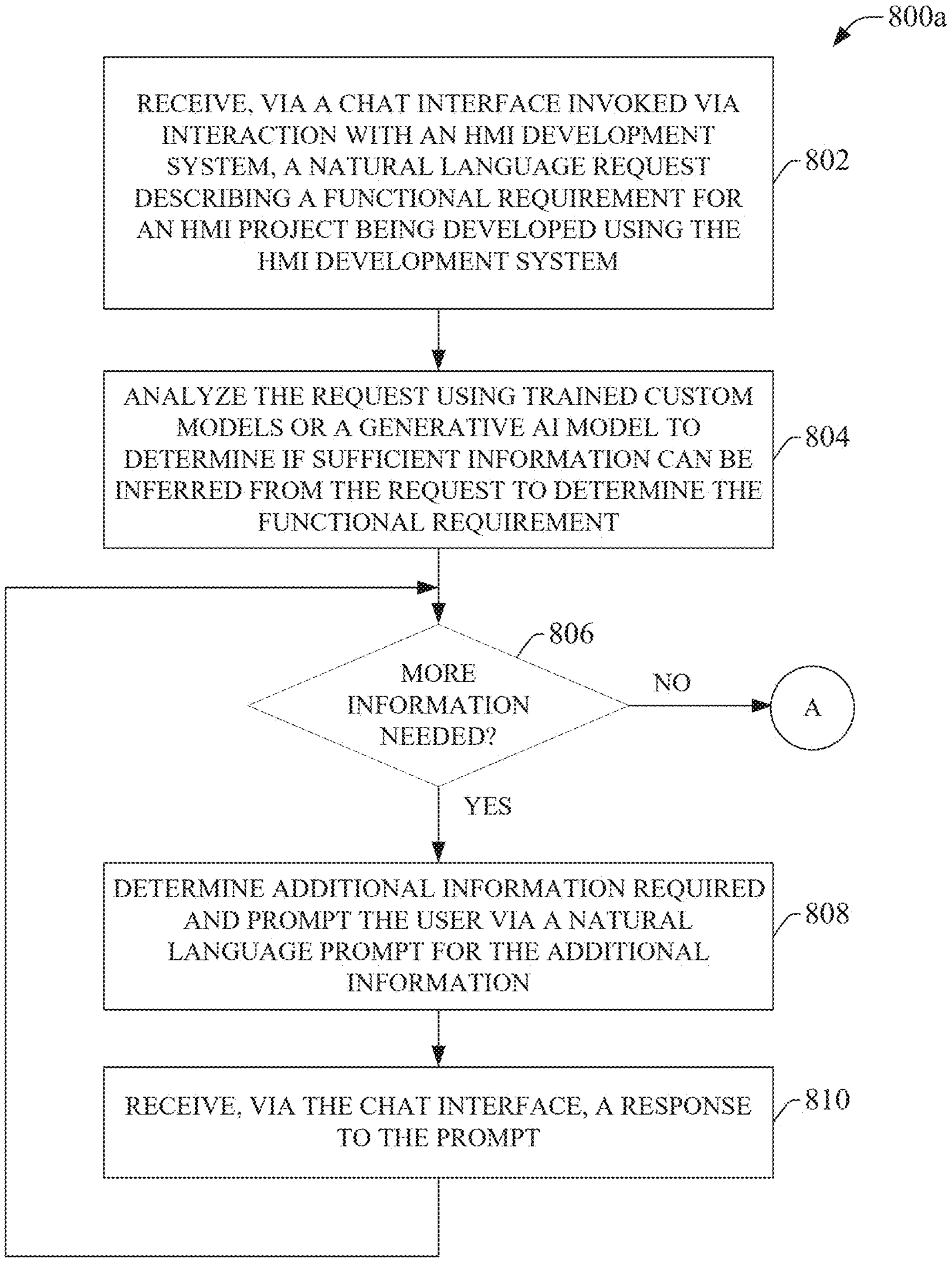
FIG. 8*a* is a flowchart of a first part of an example methodology for developing an industrial HMI project using natural language design input.
Figure 8B:
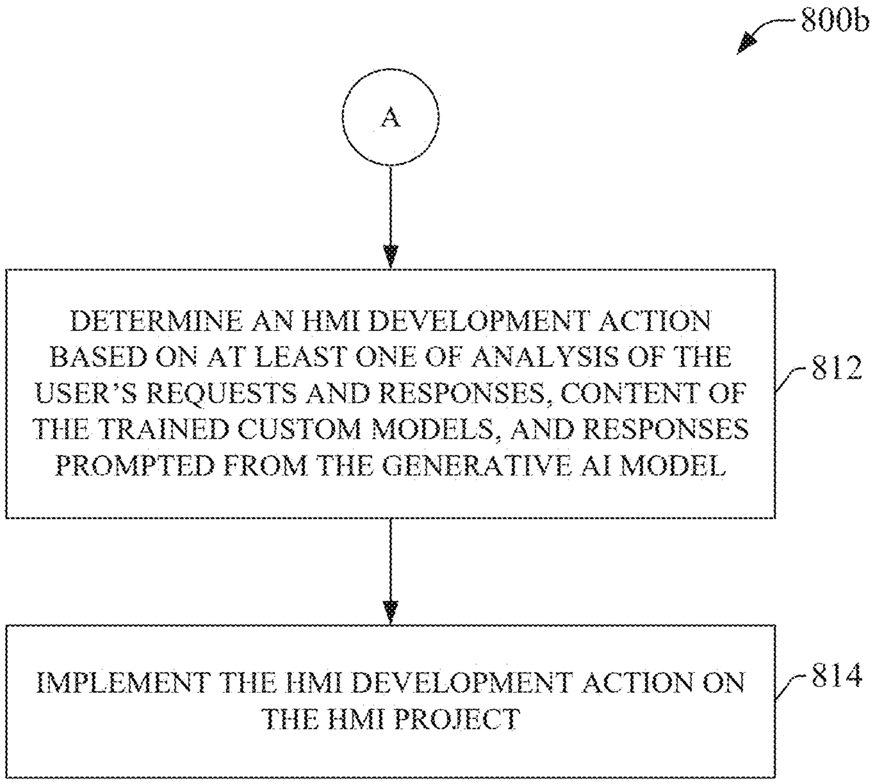
FIG. 8*b* is a flowchart of a second part of the example methodology for developing an industrial HMI project using natural language design input.
Figure 9:
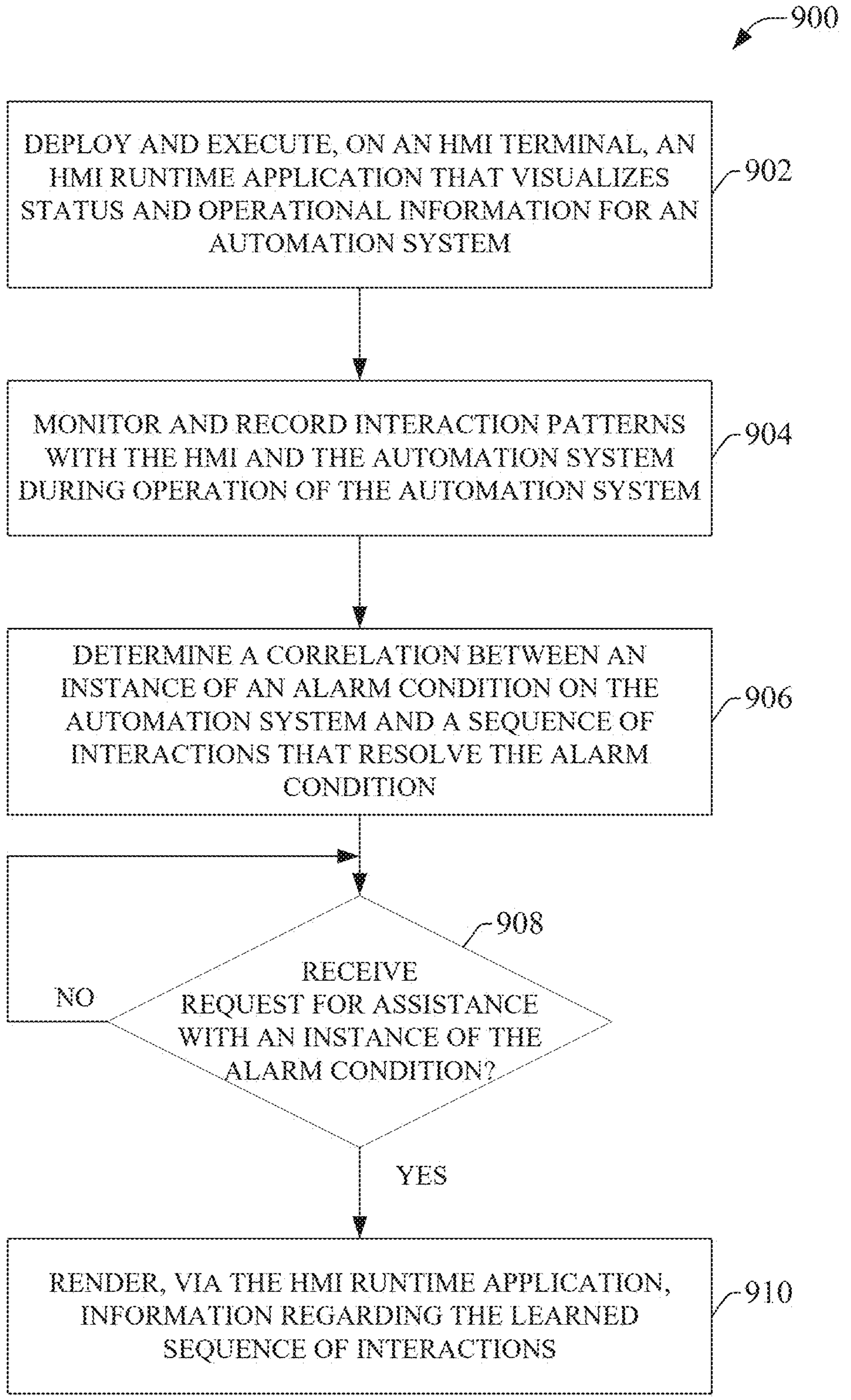
FIG. 9 is a flowchart of an example methodology for providing dynamic alarm assistance via an industrial HMI application.

FIGS. 8*a*-9 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 8*a* illustrates a first part of an example methodology 800*a* for developing an industrial HMI project using natural language design input. Initially, at 802, a natural language request describing a functional requirement for an HMI project being developed using an HMI development system is received via a chat interface or another type of natural language interface supported by the HMI development system. The chat interface can be invoked via an interaction with the HMI development system's development interface. The natural language request can describe substantially any type of function requirement that the user wishes to be supported by the HMI application. For example, the user may submit written or spoken natural language descriptions of desired visualization layouts, screen navigation definitions, graphical content to be included on a display screen and the screen locations at which the content is to reside, alarm requirements, data sources or tags that are to control the animation properties of selected graphical objects, or other such natural language input. The natural language request may also describe the functional requirements in more general terms; e.g., by describing the types of information generated by the automation system that the user wishes to see rendered on the HMI. In some scenarios, the natural language request may reference an existing element or property of the HMI project being developed, such as a graphical object or data link definition that has already been added to the project (e.g., "Link the fill animation for Tank 2 to the Material 1 Tank Level tag"; "Move Valve 1 to the right side of the screen", etc.).

At 804, the request received at step 802 is analyzed by the HMI development system using trained custom models or a generative AI to determine if sufficient information can be inferred from the request to determine an HMI development action that will satisfy the functional requirement. The custom models can be trained using sets of training data representing a range of domain-specific industrial knowledge. Example training data that can be used to train the custom models includes, but is not limited to, information defining industrial standards (e.g., global or vertical-specific safety standards, food and drug standards, design standards such as the ISA-88 standard, etc.), technical specifics or design standards for various types of industrial control applications (e.g., batch control processes, die casting, valve control, agitator control, etc.), knowledge of specific industrial verticals (e.g., automotive, food and beverage, pharmaceuticals, oil and gas, textiles, mining, etc.), knowledge of industrial best practices, technical specifications for various types of industrial devices or assets (e.g., industrial controllers, motor drives such as variable frequency drives, sensors, etc.), control design rules, sample HMI display layouts for various types of control applications or use cases, customer-specific training data describing in-house HMI design preferences or standards (e.g., preferred screen layout formats, preferred types of graphics, preferred text fonts, etc.), or other such training data. As part of the analysis, the system can also generate and submit prompts to the generative AI model, and use the content of the generative AI model's responses in connection with analyzing the user's request and generating natural languages responses directed to the user if necessary.

At 806, a determination is made as to whether more information is needed from the user in order to determine the user's functional requirements and apply a suitable HMI development action determined to satisfy these requirements. If additional information is required (YES at step 806), the methodology proceeds to step 808, where the HMI development system determines the additional information required, and renders a natural language prompt designed to guide the user toward providing the additional information. In determining the nature of the necessary additional information, the system can reference the industry knowledge encoded in the trained models as well as responses prompted from the generative AI model. At 810, a response to the prompt generated at step 808 is received via the chat interface.

Steps 806-810 are repeated as a natural language dialog with the user until sufficient information translatable to a set of functional requirements for the requested HMI development action has been obtained. When no further information is required from the user (NO at step 806), the methodology proceeds to the second part 800*b* illustrated in FIG. 8*b*. At 812, the HMI development system determines a development action to be applied to the HMI project based on at least one of analysis if the user's natural language request and responses as obtained at steps 802 and 810, content of the trained custom models, or responses prompted from the generative AI model. The development action may be, for example, addition of a graphical element representing an industrial asset or device to a display screen, removal of a graphical element from a screen, creation or modification of a data link between an animation property of a graphical object and a controller data tag that is to control the animation property, creation or deletion of a display screen, definition of a screen navigation schema or architecture, addition and configuration of a control object (e.g., a graphical push button or a data entry field), or other such development actions. At 814, the development action determined at step 812 is implemented on the HMI project by the HMI development system.

In general, the natural language requests received at step 802 can be submitted by multiple users having different roles within the industrial enterprise—including plant engineers, maintenance staff, and machine or line operators—in a collaborative development scenario. The prompts generated by the HMI development system at step 808 may be formulated based on an inferred level of expertise of the user, as determined based on an analysis of the terminology used in the user's original natural language request received at step 802, such that the prompts have a high likelihood of being understood by the recipient. In some embodiments, the HMI development system can process natural language development requests based on the role of the user submitting the request. For example, the system may develop multiple different role-specific versions of the HMI application in parallel, such that each version is developed using natural language development requests submitted by a given one of the multiple user roles. Alternatively, the system may apply all natural language development requests to the same version of the HMI application, prioritizing the development requests of one role over another role (e.g., by overriding a development request of a line operator in favor of a development request of a plant engineer if the two development requests conflict with one another).

FIG. 9 illustrates an example methodology 900 for providing dynamic alarm assistance via an industrial HMI application. Initially, at 902, an HMI runtime application that visualizes status and operational information for an automation system, is deployed and executed on an HMI terminal. At 904, interaction patterns with the HMI and with the automation system are monitored and recorded during operation of the automation system. These interaction patterns can include, for example, HMI screen navigation interactions, interactions with graphical controls on the HMI (e.g., graphical pushbuttons, switches, data entry fields, etc.) or with control panel devices, entry of data values to selected data entry fields of the HMI, clearance of parts or debris from areas of the automation system monitored by presence sensors, entry of setpoint values, placement of the automation system in a particular operating mode (e.g., automatic, semi-automatic, manual, etc.), manual movement of machine components during manual mode via interaction with control panel devices, or other such interactions.

At 906, a correlation between an instance of an alarm condition on the automation system reported by the HMI application and a sequence of interactions that resolve the alarm condition is determined based on the monitoring performed at step 904. At 908, a determination is made as to whether a request for assistance with a current instance of the alarm condition is received. The request can be submitted, for example, as a natural language request for assistance submitted via an integrated chat interface of the HMI application, or may be submitted via another interaction with the HMI. If a request for assistance is received (YES at step 908), the methodology proceeds to step 910, where information regarding the learned sequence of interactions is rendered via the HMI application. This information maybe a natural language description of the steps to be performed to address the alarm condition or a graphical demonstration of the learned interactions.

Embodiments, systems, and components described herein, as well as control systems and automation environments in which various aspects set forth in the subject specification can be carried out, can include computer or network components such as servers, clients, programmable logic controllers (PLCs), automation controllers, communications modules, mobile computers, on-board computers for mobile vehicles, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, safety networks, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 10:
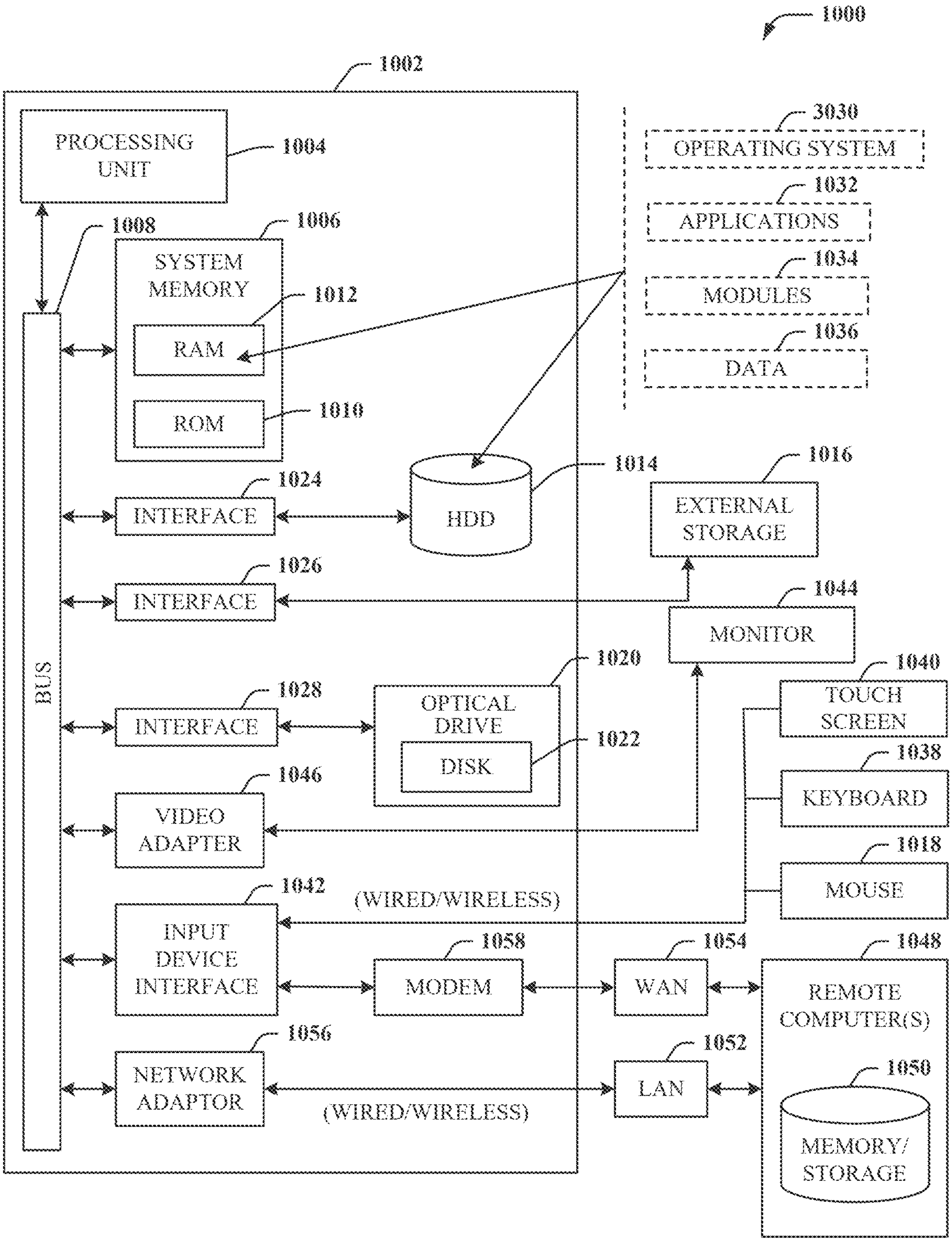
FIG. 10 is an example computing environment.
Figure 11:
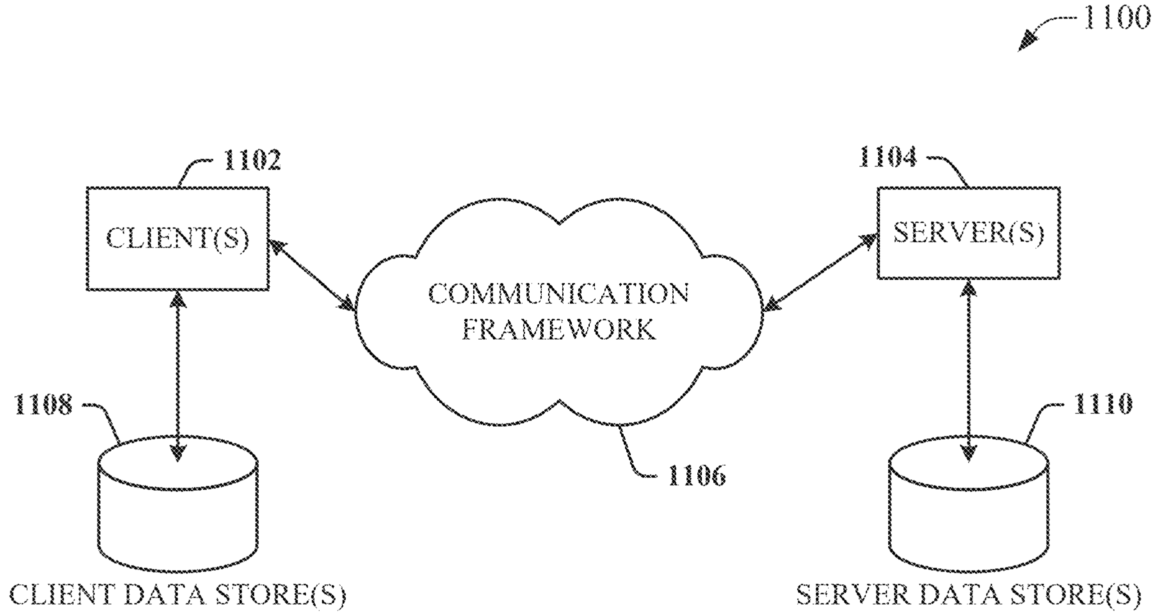
FIG. 11 is an example networking environment.

In order to provide a context for the various aspects of the disclosed subject matter, FIGS. 10 and 11 as well as the following discussion are intended to provide a brief, general description of a suitable environment in which the various aspects of the disclosed subject matter may be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 30. In such an embodiment, operating system 1030 can comprise one virtual machine (VM) of multiple VMs hosted at computer 1002. Furthermore, operating system 1030 can provide runtime environments, such as the Java runtime environment or the .NET framework, for application programs 1032. Runtime environments are consistent execution environments that allow application programs 1032 to run on any operating system that includes the runtime environment. Similarly, operating system 1030 can support containers, and application programs 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1018. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1044 or other type of display device can be also connected to the system bus 1008 via an interface, such as a video adapter 1046. In addition to the monitor 1044, a computer typically includes other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1052 through a wired and/or wireless communication network interface or adapter 1056. The adapter 1056 can facilitate wired or wireless communication to the LAN 1052, which can also include a wireless access point (AP) disposed thereon for communicating with the adapter 1056 in a wireless mode.

When used in a WAN networking environment, the computer 1002 can include a modem 1058 or can be connected to a communications server on the WAN 1054 via other means for establishing communications over the WAN 1054, such as by way of the Internet. The modem 1058, which can be internal or external and a wired or wireless device, can be connected to the system bus 1008 via the input device interface 1042. In a networked environment, program modules depicted relative to the computer 1002 or portions thereof, can be stored in the remote memory/storage device 1050. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1052 or WAN 1054 e.g., by the adapter 1056 or modem 1058, respectively. Upon connecting the computer 1002 to an associated cloud storage system, the external storage interface 1026 can, with the aid of the adapter 1056 and/or modem 1058, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 11 is a schematic block diagram of a sample computing environment 1100 with which the disclosed subject matter can interact. The sample computing environment 1100 includes one or more client(s) 1102. The client(s) 1102 can be hardware and/or software (e.g., threads, processes, computing devices). The sample computing environment 1100 also includes one or more server(s) 1104. The server(s) 1104 can also be hardware and/or software (e.g., threads, processes, computing devices). The servers 1104 can house threads to perform transformations by employing one or more embodiments as described herein, for example. One possible communication between a client 1102 and servers 1104 can be in the form of a data packet adapted to be transmitted between two or more computer processes. The sample computing environment 1100 includes a communication framework 1106 that can be employed to facilitate communications between the client(s) 1102 and the server(s) 1104. The client(s) 1102 are operably connected to one or more client data store(s) 1108 that can be employed to store information local to the client(s) 1102. Similarly, the server(s) 1104 are operably connected to one or more server data store(s) 1110 that can be employed to store information local to the servers 1104.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system, comprising:

a memory that stores executable components; and a processor, operatively coupled to the memory, that executes the executable components, the executable components comprising:

a user interface component configured to render a human-machine interface (HMI) development interface and to receive, via interaction with the HMI development interface, a first natural language design prompt that describes a first functional requirement from a first user having a first defined role within an industrial enterprise and a second natural language design prompt that describes a second functional requirement from a second user having a second defined role within the industrial enterprise;

a generative artificial intelligence (AI) component configured to determine a first edit to the HMI project that satisfies the first functional requirement and a second edit to the HMI project that satisfies the second functional requirement based on analysis of the first natural language design prompt, the second natural language design prompt, and content of one or more custom models trained with training data; and an HMI generation component configured to selectively apply at least one of the first edit or the second edit to the HMI project based on relative priorities of the first defined role and the second defined role, wherein the HMI project defines display screens, layouts of graphical objects on the display screens, and communication links between the graphical objects and corresponding sources of data generated by an industrial automation system, and the HMI project is configured to, in response to execution on an HMI terminal device, read data from the sources of data and visualize the data via the graphical objects defined by the HMI project.

2. The system of claim 1, wherein at least one of the first defined role or the second defined role comprises a controls engineer, a plant engineer, a maintenance technician, or a machine operator.

3. The system of claim 1, wherein the first defined role is defined to have a higher priority than the second defined role, and the HMI generation component is configured to, in response to determining that the first edit and the second edit are in conflict with one another, apply the first edit and reject the second edit based on the higher priority of the first defined role.

4. The system of claim 1, wherein the HMI generation component is configured to generate a first version of the HMI project comprising edits submitted as natural language design prompts from one or more users of the first role and a second version of the HMI project comprising edits submitted as natural language design prompts from one or more users of the second role.

5. The system of claim 1, wherein at least one of the first edit or the second edit comprises at least one of creating the HMI project, creating a display screen of the display screens, setting a color scheme of the display screen, adding a graphical object to the display screen, setting a location or an orientation of the graphical object on the display screen, defining a communication link between an animation property of the graphical object and a data tag of an industrial controller, resizing the graphical object, defining an alarm condition that is to trigger rendering of an alarm, defining alarm text for the alarm, adding a graphical control to the display screen, defining a navigation scheme for navigating between the display screens, adding a definition of an industrial controller with which the HMI project will exchange data values, or generating a script to be executed in response to a specified condition.

6. The system of claim 1, wherein the training data comprises at least one of information defining industrial standards, technical specifics for respective types of industrial control applications, knowledge of different industrial verticals, information describing industrial best practices, technical specifications for different types of industrial devices or machines, control design rules, sample HMI display layouts for respective types of control applications, or customer-specific training data describing in-house HMI design preferences.

7. The system of claim 1, wherein at least one of the first natural language design prompt or the second natural language design prompt describes at least one of a visualization layout to be implemented by the display screens, a screen navigation requirement, industrial assets included in the industrial automation system, a type of manufacturing application performed by the industrial automation system, an alarm requirement, or a source of data that is to control an animation property of one of the graphical objects.

8. The system of claim 1, wherein the generative AI component is further configured to, in response to receipt of at least one of the first natural language design prompt or the second natural language design prompt, formulate a prompt, directed to a generative AI model, designed to obtain a response from the generative AI model comprising information used by the generative AI component to determine the first edit or the second edit to be applied to the HMI project, wherein the prompt is generated based on the content of one or more custom models.

9. The system of claim 1, wherein the generative AI component is further configured to, in response to determining, based on analysis of the first natural language design prompt, that additional information will allow the generative AI component to determine the first edit to the HMI project such that the first edit has a probability of satisfying the functional requirement that exceeds a threshold:

generate a natural language response to the first natural language design prompt that prompts for the additional information, render the natural language response via the user interface component, and determine the first edit to be applied to the HMI project based on analysis of the first natural language design input, the content of the one or more custom models, and the additional information.

10. The system of claim 9, wherein the generative AI component is further configured to formulate a wording of the first natural language design prompt based on an inferred level of expertise associated with the first defined role.

11. A method, comprising:

rendering, by a system comprising a processor, a human-machine interface (HMI) development interface on one or more client devices;

receiving, by the system via interaction with the HMI development interface, a first natural language design prompt that describes a first functional requirement from a first user having a first defined role within an industrial enterprise and a second natural language design prompt that describes a second functional requirement from a second user having a second defined role within the industrial enterprise;

determining, by the system, a first edit to the HMI project that satisfies the first functional requirement and a second edit to the HMI project that satisfies the second functional requirement based on analysis of the first natural language design prompt, the second natural language design prompt, and content of one or more custom models trained with training data; and selectively applying, by the system, at least one of the first edit or the second edit to the HMI project based on relative priorities of the first defined role and the second defined role, wherein the HMI project defines display screens, layouts of graphical objects on the display screens, and communication links between the graphical objects and corresponding sources of data generated by an industrial automation system, and the HMI project is configured to, in response to execution on an HMI terminal device, read data from the sources of data and visualize the data via the graphical objects defined by the HMI project.

12. The method of claim 11, wherein at least one of the first defined role or the second defined role comprises a controls engineer, a plant engineer, a maintenance technician, or a machine operator.

13. The method of claim 11, wherein the first defined role is defined to have a higher priority than the second defined role, and the method further comprises, in response to determining that the first edit and the second edit are in conflict with one another, applying, by the system, the first edit and rejecting the second edit based on the higher priority of the first defined role.

14. The method of claim 11, further comprising generating, by the system, a first version of the HMI project comprising edits submitted as natural language design prompts from one or more users of the first role and a second version of the HMI project comprising edits submitted as natural language design prompts from one or more users of the second role.

15. The method of claim 11, wherein at least one of the first edit or the second edit comprises at least one of creating the HMI project, creating a display screen of the display screens, setting a color scheme of the display screen, adding a graphical object to the display screen, setting a location or an orientation of the graphical object on the display screen, defining a communication link between an animation property of the graphical object and a data tag of an industrial controller, resizing the graphical object, defining an alarm condition that is to trigger rendering of an alarm, defining alarm text for the alarm, adding a graphical control to the display screen, defining a navigation scheme for navigating between the display screens, adding a definition of an industrial controller with which the HMI project will exchange data values, or generating a script to be executed in response to a specified condition.

16. The method of claim 11, wherein the training data comprises at least one of information defining industrial standards, technical specifics for respective types of industrial control applications, knowledge of different industrial verticals, information describing industrial best practices, technical specifications for different types of industrial devices or machines, control design rules, sample HMI display layouts for respective types of control applications, or customer-specific training data describing in-house HMI design preferences.

17. The method of claim 11, wherein at least one of the first natural language design prompt or the second natural language design prompt describes at least one of a visualization layout to be implemented by the display screens, a screen navigation requirement, industrial assets included in the industrial automation system, a type of manufacturing application performed by the industrial automation system, an alarm requirement, or a source of data that is to control an animation property of one of the graphical objects.

18. The method of claim 11, further comprising, in response to receipt of at least one of the first natural language design prompt or the second natural language design prompt, formulating, by the system, a prompt, directed to a generative AI model, designed to obtain a response from the generative AI model comprising information used by the generative AI component to determine the first edit or the second edit to be applied to the HMI project, wherein the prompt is generated based on the content of one or more custom models.

19. A non-transitory computer-readable medium having stored thereon instructions that, in response to execution, cause a human-machine interface (HMI) development system comprising a processor to perform operations, the operations comprising:

rendering a human-machine interface (HMI) development interface on one or more client devices;

receiving, via interaction with the HMI development interface, a first natural language design prompt that describes a first functional requirement from a first user having a first defined role within an industrial enterprise;

receiving, via interaction with the HMI development interface, a second natural language design prompt that describes a second functional requirement from a second user having a second defined role within the industrial enterprise;

determining a first edit to the HMI project that satisfies the first functional requirement and a second edit to the HMI project that satisfies the second functional requirement based on analysis of the first natural language design prompt, the second natural language design prompt, and content of one or more custom models trained with training data; and selectively applying at least one of the first edit or the second edit to the HMI project based on relative priorities of the first defined role and the second defined role, wherein the HMI project defines display screens, layouts of graphical objects on the display screens, and communication links between the graphical objects and corresponding sources of data generated by an industrial automation system, and the HMI project is configured to, in response to execution on an HMI terminal device, read data from the sources of data and visualize the data via the graphical objects defined by the HMI project.

20. The non-transitory computer-readable medium of claim 19, wherein the first defined role is defined to have a higher priority than the second defined role, and the operations further comprise, in response to determining that the first edit and the second edit are in conflict with one another, applying, by the system, the first edit and rejecting the second edit based on the higher priority of the first defined role.

* * * * *